US008931008B2

(12) United States Patent
McCoy et al.

(10) Patent No.: US 8,931,008 B2
(45) Date of Patent: Jan. 6, 2015

(54) PROMOTIONAL PHILOSOPHY FOR A VIDEO-ON-DEMAND-RELATED INTERACTIVE DISPLAY WITHIN AN INTERACTIVE TELEVISION APPLICATION

(75) Inventors: Robert H. McCoy, Broken Arrow, OK (US); Daniel I. Lumley, Owasso, OK (US); Bryan Mitchell Drummond, Broken Arrow, OK (US); Toby DeWeese, Tulsa, OK (US)

(73) Assignee: United Video Properties, Inc., Santa Clara, CA (US)

( * ) Notice: Subject to any disclaimer, the term of this patent is extended or adjusted under 35 U.S.C. 154(b) by 0 days.

(21) Appl. No.: 12/559,336

(22) Filed: Sep. 14, 2009

(65) Prior Publication Data

US 2010/0131976 A1    May 27, 2010

Related U.S. Application Data

(63) Continuation of application No. 10/898,002, filed on Jul. 22, 2004, now abandoned, which is a continuation of application No. 09/607,208, filed on Jun. 28, 2000, now abandoned.

(60) Provisional application No. 60/141,575, filed on Jun. 29, 1999.

(51) Int. Cl.
*H04N 5/445* (2011.01)
*H04N 21/472* (2011.01)
*H04N 21/462* (2011.01)
*H04N 21/482* (2011.01)
*H04N 7/173* (2011.01)
*H04N 21/422* (2011.01)
*H04N 21/45* (2011.01)
*H04N 21/81* (2011.01)
*H04N 21/258* (2011.01)

(52) U.S. Cl.
CPC ... *H04N 21/42202* (2013.01); *H04N 21/47202* (2013.01); *H04N 21/4622* (2013.01); *H04N 21/4826* (2013.01); *H04N 7/17318* (2013.01); *H04N 5/44543* (2013.01); *H04N 21/4532* (2013.01); *H04N 21/812* (2013.01); *H04N 21/25891* (2013.01); *H04N 21/25808* (2013.01)
USPC .................... 725/46; 725/37; 725/44; 725/45

(58) Field of Classification Search
None
See application file for complete search history.

(56) References Cited

U.S. PATENT DOCUMENTS 3,440,427 A    4/1969 Kammer
3,492,577 A    1/1970 Reiter et al.
(Continued)

FOREIGN PATENT DOCUMENTS

AU    56198-98    7/1998
AU    731010    7/1998
(Continued)

OTHER PUBLICATIONS

U.S. Appl. No. 09/034,934, filed Mar. 4, 1998, Ellis et al.
(Continued)

*Primary Examiner* — Chenea Smith
(74) *Attorney, Agent, or Firm* — Ropes & Gray LLP

(57) ABSTRACT

Systems and methods for providing an interactive display having indicators of video-on-demand programs are described. The systems and methods select indicators for inclusion in the interactive display according to a promotional selection algorithm.

22 Claims, 15 Drawing Sheets

(56) References Cited

U.S. PATENT DOCUMENTS

| | | |
|---|---|---|
| 3,493,674 A | 2/1970 | Houghton |
| 3,729,581 A | 4/1973 | Anderson |
| 3,833,757 A | 9/1974 | Kirk, Jr. et al. |
| 3,891,792 A | 6/1975 | Kimura |
| 3,936,868 A | 2/1976 | Thorpe |
| 3,996,583 A | 12/1976 | Hutt et al. |
| 4,004,085 A | 1/1977 | Makino et al. |
| 4,016,361 A | 4/1977 | Pandey |
| 4,026,555 A | 5/1977 | Kirschner et al. |
| 4,031,548 A | 6/1977 | Kato et al. |
| 4,052,719 A | 10/1977 | Hutt et al. |
| 4,058,830 A | 11/1977 | Guinet et al. |
| 4,079,419 A | 3/1978 | Siegle et al. |
| 4,081,753 A | 3/1978 | Miller |
| 4,081,754 A | 3/1978 | Jackson |
| 4,096,524 A | 6/1978 | Scott |
| 4,134,127 A | 1/1979 | Campioni |
| 4,139,860 A | 2/1979 | Micic et al. |
| 4,150,254 A | 4/1979 | Schussler et al. |
| 4,156,850 A | 5/1979 | Beyers, Jr. |
| 4,161,728 A | 7/1979 | Insam |
| 4,162,513 A | 7/1979 | Beyers, Jr. et al. |
| 4,170,782 A | 10/1979 | Miller |
| 4,186,413 A | 1/1980 | Mortimer |
| 4,203,130 A | 5/1980 | Doumit et al. |
| 4,205,343 A | 5/1980 | Barrett |
| 4,218,698 A | 8/1980 | Bart et al. |
| 4,228,543 A | 10/1980 | Jackson |
| 4,231,031 A | 10/1980 | Crowther et al. |
| 4,233,628 A | 11/1980 | Ciciora |
| 4,249,211 A | 2/1981 | Baba et al. |
| 4,249,213 A | 2/1981 | Imaide et al. |
| 4,261,006 A | 4/1981 | Weintraub et al. |
| 4,264,924 A | 4/1981 | Freeman |
| 4,264,925 A | 4/1981 | Freeman et al. |
| 4,270,145 A | 5/1981 | Farina |
| 4,271,532 A | 6/1981 | Wine |
| 4,276,597 A | 6/1981 | Dissly et al. |
| 4,283,787 A | 8/1981 | Chambers |
| 4,288,809 A | 9/1981 | Yabe |
| 4,290,142 A | 9/1981 | Schnee et al. |
| 4,305,101 A | 12/1981 | Yarbrough et al. |
| 4,329,684 A | 5/1982 | Monteath et al. |
| 4,331,974 A | 5/1982 | Cogswell et al. |
| 4,337,480 A | 6/1982 | Bourassin et al. |
| 4,337,483 A | 6/1982 | Guillou |
| 4,344,090 A | 8/1982 | Belisomi et al. |
| 4,367,559 A | 1/1983 | Tults |
| 4,375,651 A | 3/1983 | Templin et al. |
| 4,381,522 A | 4/1983 | Lambert |
| 4,388,645 A | 6/1983 | Cox et al. |
| 4,390,901 A | 6/1983 | Keiser |
| 4,393,376 A | 7/1983 | Thomas |
| 4,405,946 A | 9/1983 | Knight |
| 4,412,244 A | 10/1983 | Shanley, II |
| 4,413,281 A | 11/1983 | Thonnart |
| 4,420,769 A | 12/1983 | Novak |
| 4,425,579 A | 1/1984 | Merrell |
| 4,425,581 A | 1/1984 | Schweppe et al. |
| 4,429,385 A | 1/1984 | Cichelli et al. |
| 4,439,784 A | 3/1984 | Furukawa et al. |
| 4,449,249 A | 5/1984 | Price |
| 4,456,925 A | 6/1984 | Skerlos et al. |
| 4,466,017 A | 8/1984 | Banker |
| 4,477,830 A | 10/1984 | Lindman et al. |
| 4,488,179 A | 12/1984 | Kruger et al. |
| 4,495,654 A | 1/1985 | Deiss |
| 4,496,171 A | 1/1985 | Cherry |
| 4,496,804 A | 1/1985 | Hung |
| 4,496,976 A | 1/1985 | Swanson et al. |
| 4,510,623 A | 4/1985 | Bonneau et al. |
| 4,520,404 A | 5/1985 | Von Kohorn |
| 4,523,228 A | 6/1985 | Banker |
| 4,527,194 A | 7/1985 | Sirazi |
| 4,531,020 A | 7/1985 | Wechselberger et al. |
| 4,533,910 A | 8/1985 | Sukonick et al. |
| 4,536,791 A | 8/1985 | Campbell et al. |
| 4,547,804 A | 10/1985 | Greenberg |
| 4,554,584 A | 11/1985 | Elam et al. |
| 4,555,775 A | 11/1985 | Pike |
| 4,566,034 A | 1/1986 | Harger et al. |
| 4,573,072 A | 2/1986 | Freeman |
| 4,587,520 A | 5/1986 | Astle |
| 4,595,951 A | 6/1986 | Filliman |
| 4,595,952 A | 6/1986 | Filliman |
| 4,598,288 A | 7/1986 | Yarbrough et al. |
| 4,602,279 A | 7/1986 | Freeman |
| 4,605,964 A | 8/1986 | Chard |
| 4,605,973 A | 8/1986 | Von Kohorn |
| 4,620,229 A | 10/1986 | Amano et al. |
| 4,622,545 A | 11/1986 | Atkinson |
| 4,635,109 A | 1/1987 | Comeau |
| 4,635,121 A | 1/1987 | Hoffman |
| 4,641,205 A | 2/1987 | Beyers, Jr. |
| 4,677,466 A | 6/1987 | Lert, Jr. et al. |
| 4,685,131 A | 8/1987 | Horne |
| 4,689,022 A | 8/1987 | Peers et al. |
| 4,691,351 A | 9/1987 | Hayashi et al. |
| 4,694,490 A | 9/1987 | Harvey et al. |
| 4,701,794 A | 10/1987 | Froling et al. |
| 4,704,725 A | 11/1987 | Harvey et al. |
| 4,705,725 A | 11/1987 | Glajch et al. |
| 4,706,121 A | 11/1987 | Young |
| 4,712,105 A | 12/1987 | Kohler |
| 4,718,107 A | 1/1988 | Hayes |
| RE32,632 E | 3/1988 | Atkinson |
| 4,729,027 A | 3/1988 | Hakamada et al. |
| 4,734,769 A | 3/1988 | Davis |
| 4,745,549 A | 5/1988 | Hashimoto |
| 4,746,983 A | 5/1988 | Hakamada |
| 4,748,618 A | 5/1988 | Brown et al. |
| 4,750,036 A | 6/1988 | Martinez |
| 4,750,213 A | 6/1988 | Novak |
| 4,751,578 A | 6/1988 | Reiter et al. |
| 4,754,326 A | 6/1988 | Kram et al. |
| 4,768,228 A | 8/1988 | Clupper et al. |
| 4,772,882 A | 9/1988 | Mical |
| 4,775,935 A | 10/1988 | Yourick |
| 4,785,408 A | 11/1988 | Britton et al. |
| 4,787,063 A | 11/1988 | Muguet |
| 4,812,834 A | 3/1989 | Wells |
| 4,814,883 A | 3/1989 | Perine et al. |
| 4,821,102 A | 4/1989 | Ichikawa et al. |
| 4,821,211 A | 4/1989 | Torres |
| 4,829,558 A | 5/1989 | Welsh |
| 4,847,604 A | 7/1989 | Doyle |
| 4,847,700 A | 7/1989 | Freeman |
| 4,855,813 A | 8/1989 | Russell et al. |
| 4,857,999 A | 8/1989 | Welsh |
| 4,862,268 A | 8/1989 | Campbell et al. |
| 4,864,429 A | 9/1989 | Eigeldinger et al. |
| 4,873,584 A | 10/1989 | Hashimoto |
| 4,873,623 A | 10/1989 | Lane et al. |
| 4,882,732 A | 11/1989 | Kaminaga et al. |
| 4,884,223 A | 11/1989 | Ingle et al. |
| 4,888,796 A | 12/1989 | Olivo, Jr. |
| 4,890,168 A | 12/1989 | Inoue et al. |
| 4,890,320 A | 12/1989 | Monslow et al. |
| 4,890,321 A | 12/1989 | Seth-Smith et al. |
| 4,894,789 A | 1/1990 | Yee |
| 4,899,136 A | 2/1990 | Beard et al. |
| 4,905,094 A | 2/1990 | Pocock et al. |
| 4,908,707 A | 3/1990 | Kinghorn |
| 4,908,713 A | 3/1990 | Levine |
| 4,908,859 A | 3/1990 | Bennett et al. |
| 4,914,517 A | 4/1990 | Duffield |
| 4,914,732 A | 4/1990 | Henderson et al. |
| 4,918,531 A | 4/1990 | Johnson |
| 4,930,158 A | 5/1990 | Vogel |
| 4,930,160 A | 5/1990 | Vogel |
| 4,931,783 A | 6/1990 | Atkinson |
| 4,935,865 A | 6/1990 | Rowe et al. |
| 4,937,821 A | 6/1990 | Boulton |
| 4,937,863 A | 6/1990 | Robert et al. |

(56) References Cited

U.S. PATENT DOCUMENTS

| | | |
|---|---|---|
| 4,939,507 A | 7/1990 | Beard et al. |
| 4,954,882 A | 9/1990 | Kamemoto |
| 4,959,720 A | 9/1990 | Duffield et al. |
| 4,963,994 A | 10/1990 | Levine |
| 4,977,455 A | 12/1990 | Young |
| 4,987,486 A | 1/1991 | Johnson et al. |
| 4,991,011 A | 2/1991 | Johnson et al. |
| 4,991,012 A | 2/1991 | Yoshino |
| 4,992,782 A | 2/1991 | Sakamoto et al. |
| 4,992,940 A | 2/1991 | Dworkin |
| 4,995,078 A | 2/1991 | Monslow et al. |
| 4,996,642 A | 2/1991 | Hey |
| 4,998,171 A | 3/1991 | Kim et al. |
| 5,003,384 A | 3/1991 | Durden et al. |
| 5,008,853 A | 4/1991 | Bly et al. |
| 5,014,125 A | 5/1991 | Pocock et al. |
| 5,023,721 A | 6/1991 | Moon-Hwan |
| 5,027,400 A | 6/1991 | Baji et al. |
| 5,031,045 A | 7/1991 | Kawasaki |
| 5,036,314 A | 7/1991 | Barillari et al. |
| 5,038,211 A | 8/1991 | Hallenbeck |
| 5,040,067 A | 8/1991 | Yamazaki |
| 5,045,947 A | 9/1991 | Beery |
| 5,047,867 A | 9/1991 | Strubbe et al. |
| 5,058,160 A | 10/1991 | Banker et al. |
| 5,062,060 A | 10/1991 | Kolnick |
| 5,068,734 A | 11/1991 | Beery |
| 5,072,412 A | 12/1991 | Henderson, Jr. et al. |
| 5,075,771 A | 12/1991 | Hashimoto |
| 5,083,205 A | 1/1992 | Arai |
| 5,083,800 A | 1/1992 | Lockton |
| 5,091,785 A | 2/1992 | Canfield et al. |
| 5,093,921 A | 3/1992 | Bevins, Jr. |
| 5,099,319 A | 3/1992 | Esch et al. |
| 5,103,314 A | 4/1992 | Keenan |
| 5,105,184 A | 4/1992 | Pirani et al. |
| 5,109,279 A | 4/1992 | Ando |
| 5,119,188 A | 6/1992 | McCalley et al. |
| 5,121,476 A | 6/1992 | Yee |
| 5,123,046 A | 6/1992 | Levine |
| 5,126,851 A | 6/1992 | Yoshimura et al. |
| 5,128,766 A | 7/1992 | Choi |
| 5,146,335 A | 9/1992 | Kim et al. |
| 5,148,154 A | 9/1992 | Mackay et al. |
| 5,148,275 A | 9/1992 | Blatter et al. |
| 5,151,782 A | 9/1992 | Ferraro |
| 5,151,789 A | 9/1992 | Young |
| 5,155,591 A | 10/1992 | Wachob |
| 5,155,806 A | 10/1992 | Hoeber et al. |
| 5,157,768 A | 10/1992 | Hoeber et al. |
| 5,161,019 A | 11/1992 | Emanuel |
| 5,161,023 A | 11/1992 | Keenan |
| 5,162,905 A | 11/1992 | Itoh et al. |
| 5,170,388 A | 12/1992 | Endoh et al. |
| 5,172,111 A | 12/1992 | Olivo, Jr. |
| 5,177,604 A | 1/1993 | Martinez |
| 5,179,654 A | 1/1993 | Richards et al. |
| 5,195,092 A | 3/1993 | Wilson et al. |
| 5,200,823 A | 4/1993 | Yoneda et al. |
| 5,204,897 A | 4/1993 | Wyman |
| 5,206,722 A | 4/1993 | Kwan |
| 5,210,611 A | 5/1993 | Yee et al. |
| 5,212,553 A | 5/1993 | Maruoka |
| 5,214,622 A | 5/1993 | Nemoto et al. |
| 5,216,515 A | 6/1993 | Steele et al. |
| 5,220,420 A | 6/1993 | Hoarty et al. |
| 5,223,924 A | 6/1993 | Strubbe |
| 5,227,874 A | 7/1993 | Von Kohorn |
| 5,231,493 A | 7/1993 | Apitz |
| RE34,340 E | 8/1993 | Freeman |
| 5,233,423 A | 8/1993 | Jernigan et al. |
| 5,233,654 A | 8/1993 | Harvey et al. |
| 5,235,415 A | 8/1993 | Bonicel et al. |
| 5,236,199 A | 8/1993 | Thompson, Jr. |
| 5,237,411 A | 8/1993 | Fink et al. |
| 5,237,417 A | 8/1993 | Hayashi et al. |
| 5,237,418 A | 8/1993 | Kaneko |
| 5,239,540 A | 8/1993 | Rovira et al. |
| 5,245,420 A | 9/1993 | Harney et al. |
| 5,247,347 A | 9/1993 | Litteral et al. |
| 5,247,364 A | 9/1993 | Banker et al. |
| 5,247,580 A | 9/1993 | Kimura et al. |
| 5,253,066 A | 10/1993 | Vogel |
| 5,253,067 A | 10/1993 | Chaney et al. |
| 5,260,778 A | 11/1993 | Kauffman et al. |
| 5,260,788 A | 11/1993 | Takano et al. |
| 5,260,999 A | 11/1993 | Wyman |
| 5,283,561 A | 2/1994 | Lumelsky et al. |
| 5,283,639 A | 2/1994 | Esch et al. |
| 5,283,819 A | 2/1994 | Glick et al. |
| 5,285,265 A | 2/1994 | Choi |
| 5,299,006 A | 3/1994 | Kim |
| 5,301,028 A | 4/1994 | Banker et al. |
| 5,307,173 A | 4/1994 | Yuen et al. |
| 5,311,423 A | 5/1994 | Clark |
| 5,313,282 A | 5/1994 | Hayashi |
| 5,315,392 A | 5/1994 | Ishikawa et al. |
| 5,317,403 A | 5/1994 | Keenan |
| 5,319,445 A | 6/1994 | Fitts |
| 5,323,234 A | 6/1994 | Kawasaki |
| 5,323,240 A | 6/1994 | Amano et al. |
| 5,325,183 A | 6/1994 | Rhee |
| 5,325,423 A | 6/1994 | Lewis |
| 5,335,277 A | 8/1994 | Harvey et al. |
| 5,343,239 A | 8/1994 | Lappington et al. |
| 5,347,167 A | 9/1994 | Singh |
| 5,347,632 A | 9/1994 | Filepp et al. |
| 5,351,075 A | 9/1994 | Herz et al. |
| 5,353,121 A | 10/1994 | Young et al. |
| 5,357,276 A | 10/1994 | Banker et al. |
| 5,359,367 A | 10/1994 | Stockill |
| 5,359,601 A | 10/1994 | Wasilewski et al. |
| 5,365,282 A | 11/1994 | Levine |
| 5,367,316 A | 11/1994 | Ikezaki |
| 5,367,330 A | 11/1994 | Haave et al. |
| 5,373,288 A | 12/1994 | Blahut |
| 5,374,951 A | 12/1994 | Welsh |
| 5,377,317 A | 12/1994 | Bates et al. |
| 5,377,319 A | 12/1994 | Kitahara et al. |
| 5,382,983 A | 1/1995 | Kwoh et al. |
| 5,384,910 A | 1/1995 | Torres |
| 5,387,945 A | 2/1995 | Takeuchi |
| 5,389,964 A | 2/1995 | Oberle et al. |
| 5,390,027 A | 2/1995 | Henmi et al. |
| 5,398,074 A | 3/1995 | Duffield et al. |
| 5,404,393 A | 4/1995 | Remillard |
| 5,410,326 A | 4/1995 | Goldstein |
| 5,410,343 A | 4/1995 | Coddington et al. |
| 5,410,344 A | 4/1995 | Graves et al. |
| 5,410,367 A | 4/1995 | Zahavi et al. |
| 5,412,720 A | 5/1995 | Hoarty |
| 5,416,508 A | 5/1995 | Sakuma et al. |
| 5,424,770 A | 6/1995 | Schmelzer et al. |
| 5,425,101 A | 6/1995 | Woo et al. |
| 5,432,561 A | 7/1995 | Strubbe |
| 5,434,625 A | 7/1995 | Willis |
| 5,434,626 A | 7/1995 | Hayashi et al. |
| 5,436,676 A | 7/1995 | Pint et al. |
| 5,438,372 A | 8/1995 | Tsumori et al. |
| 5,440,678 A | 8/1995 | Eisen et al. |
| 5,444,499 A | 8/1995 | Saitoh |
| 5,446,919 A | 8/1995 | Wilkins |
| 5,452,012 A | 9/1995 | Saitoh |
| 5,453,146 A | 9/1995 | Kemper |
| 5,453,796 A | 9/1995 | Duffield et al. |
| 5,459,522 A | 10/1995 | Pint |
| 5,461,415 A | 10/1995 | Wolf et al. |
| 5,465,113 A | 11/1995 | Gilboy |
| 5,465,385 A | 11/1995 | Ohga et al. |
| 5,469,206 A | 11/1995 | Strubbe et al. |
| 5,477,262 A | 12/1995 | Banker et al. |
| 5,479,266 A | 12/1995 | Young et al. |
| 5,479,268 A | 12/1995 | Young et al. |
| 5,479,497 A | 12/1995 | Kovarik |

(56) References Cited

U.S. PATENT DOCUMENTS

| | | |
|---|---|---|
| 5,481,296 A | 1/1996 | Cragun et al. |
| 5,483,278 A | 1/1996 | Strubbe et al. |
| 5,485,197 A | 1/1996 | Hoarty |
| 5,485,219 A | 1/1996 | Woo |
| 5,485,221 A | 1/1996 | Banker et al. |
| 5,488,409 A | 1/1996 | Yuen et al. |
| 5,495,295 A | 2/1996 | Long |
| 5,502,504 A | 3/1996 | Marshall et al. |
| 5,515,098 A | 5/1996 | Carles |
| 5,523,794 A | 6/1996 | Mankovitz et al. |
| 5,523,796 A | 6/1996 | Marshall et al. |
| 5,524,195 A | 6/1996 | Clanton, III et al. |
| 5,525,795 A | 6/1996 | MacGregor et al. |
| 5,526,034 A | 6/1996 | Hoarty et al. |
| 5,527,257 A | 6/1996 | Piramoon |
| 5,528,304 A | 6/1996 | Cherrick et al. |
| 5,532,735 A | 7/1996 | Blahut et al. |
| 5,532,754 A | 7/1996 | Young et al. |
| 5,534,911 A | 7/1996 | Levitan |
| 5,537,141 A | 7/1996 | Harper et al. |
| 5,539,479 A | 7/1996 | Bertram |
| 5,539,822 A | 7/1996 | Lett |
| 5,541,662 A | 7/1996 | Adams et al. |
| 5,541,738 A | 7/1996 | Mankovitz |
| 5,550,576 A | 8/1996 | Klosterman |
| 5,557,338 A | 9/1996 | Maze et al. |
| 5,557,721 A | 9/1996 | Fite et al. |
| 5,559,548 A | 9/1996 | Davis et al. |
| 5,559,549 A | 9/1996 | Hendricks et al. |
| 5,559,550 A | 9/1996 | Mankovitz |
| 5,559,942 A | 9/1996 | Gough et al. |
| 5,561,471 A | 10/1996 | Kim et al. |
| 5,570,295 A | 10/1996 | Isenberg et al. |
| 5,572,442 A | 11/1996 | Schulhof et al. |
| 5,574,962 A | 11/1996 | Fardeau et al. |
| 5,579,055 A | 11/1996 | Hamilton et al. |
| 5,581,479 A | 12/1996 | McLaughlin et al. |
| 5,582,364 A | 12/1996 | Trulin et al. |
| 5,583,560 A | 12/1996 | Florin et al. |
| 5,583,563 A | 12/1996 | Wanderscheid et al. |
| 5,585,838 A | 12/1996 | Lawler et al. |
| 5,585,865 A | 12/1996 | Amano et al. |
| 5,585,866 A | 12/1996 | Miller et al. |
| 5,589,892 A | 12/1996 | Knee et al. |
| 5,592,551 A | 1/1997 | Lett et al. |
| 5,594,509 A | 1/1997 | Florin et al. |
| 5,596,373 A | 1/1997 | White et al. |
| 5,600,364 A | 2/1997 | Hendricks et al. |
| 5,600,365 A | 2/1997 | Kondo et al. |
| 5,600,366 A | 2/1997 | Schulman |
| 5,600,573 A | 2/1997 | Hendricks et al. |
| 5,602,582 A | 2/1997 | Wanderscheid et al. |
| 5,602,596 A | 2/1997 | Claussen et al. |
| 5,602,597 A | 2/1997 | Bertram |
| 5,602,598 A | 2/1997 | Shintani |
| 5,606,374 A | 2/1997 | Bertram |
| 5,608,448 A | 3/1997 | Smoral et al. |
| 5,610,653 A | 3/1997 | Abecassis |
| 5,610,664 A | 3/1997 | Bobert |
| 5,617,565 A | 4/1997 | Augenbraun et al. |
| 5,619,247 A | 4/1997 | Russo |
| 5,619,249 A | 4/1997 | Billock et al. |
| 5,619,274 A | 4/1997 | Roop et al. |
| 5,621,456 A | 4/1997 | Florin et al. |
| 5,623,613 A | 4/1997 | Rowe et al. |
| 5,625,406 A | 4/1997 | Newberry et al. |
| 5,627,940 A | 5/1997 | Rohra et al. |
| 5,629,733 A | 5/1997 | Youman et al. |
| 5,630,119 A | 5/1997 | Aristides et al. |
| 5,631,995 A | 5/1997 | Weissensteiner et al. |
| 5,633,683 A | 5/1997 | Rosengren et al. |
| 5,635,978 A * | 6/1997 | Alten et al. ............. 725/42 |
| 5,635,979 A | 6/1997 | Kostreski et al. |
| 5,635,989 A | 6/1997 | Rothmuller |
| 5,636,346 A | 6/1997 | Saxe |
| 5,640,501 A | 6/1997 | Turpin |
| 5,640,577 A | 6/1997 | Scharmer |
| 5,642,153 A | 6/1997 | Chaney et al. |
| 5,648,813 A | 7/1997 | Tanigawa et al. |
| 5,648,824 A | 7/1997 | Dunn et al. |
| 5,650,826 A | 7/1997 | Eitz |
| 5,650,831 A | 7/1997 | Farwell |
| 5,652,613 A | 7/1997 | Lazarus et al. |
| 5,652,615 A | 7/1997 | Bryant et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,657,091 A | 8/1997 | Bertram |
| 5,659,350 A | 8/1997 | Hendricks et al. |
| 5,659,366 A | 8/1997 | Kerman |
| 5,661,516 A | 8/1997 | Carles |
| 5,661,517 A | 8/1997 | Budow et al. |
| 5,663,757 A | 9/1997 | Morales |
| 5,664,111 A | 9/1997 | Nahan et al. |
| 5,666,293 A | 9/1997 | Metz |
| 5,666,498 A | 9/1997 | Amro |
| 5,666,645 A | 9/1997 | Thomas et al. |
| 5,671,276 A | 9/1997 | Eyer et al. |
| 5,671,411 A | 9/1997 | Watts et al. |
| 5,675,390 A | 10/1997 | Schindler et al. |
| 5,675,752 A | 10/1997 | Scott et al. |
| 5,677,708 A | 10/1997 | Matthews, III et al. |
| 5,682,195 A | 10/1997 | Hendricks et al. |
| 5,682,206 A | 10/1997 | Wehmeyer et al. |
| 5,686,954 A | 11/1997 | Yoshinobu et al. |
| 5,687,331 A | 11/1997 | Volk et al. |
| 5,689,648 A | 11/1997 | Diaz et al. |
| 5,689,666 A | 11/1997 | Berquist et al. |
| 5,692,214 A | 11/1997 | Levine |
| 5,694,163 A | 12/1997 | Harrison |
| 5,694,176 A | 12/1997 | Bruette et al. |
| 5,694,381 A | 12/1997 | Sako |
| 5,696,905 A | 12/1997 | Reimer et al. |
| 5,699,107 A | 12/1997 | Lawler et al. |
| 5,699,125 A | 12/1997 | Rzeszewski et al. |
| 5,708,478 A | 1/1998 | Tognazzini |
| 5,710,601 A | 1/1998 | Marshall et al. |
| 5,710,815 A | 1/1998 | Ming et al. |
| 5,715,314 A | 2/1998 | Payne et al. |
| 5,715,399 A | 2/1998 | Bezos |
| 5,717,452 A | 2/1998 | Janin et al. |
| 5,721,829 A | 2/1998 | Dunn et al. |
| 5,724,521 A | 3/1998 | Dedrick |
| 5,724,525 A | 3/1998 | Beyers et al. |
| 5,727,060 A | 3/1998 | Young |
| 5,727,163 A | 3/1998 | Bezos |
| 5,731,844 A | 3/1998 | Rauch et al. |
| 5,734,444 A | 3/1998 | Yoshinobu |
| 5,734,853 A | 3/1998 | Hendricks et al. |
| 5,734,893 A | 3/1998 | Li |
| 5,737,028 A | 4/1998 | Bertram et al. |
| 5,737,030 A | 4/1998 | Hong et al. |
| 5,740,549 A | 4/1998 | Reilly et al. |
| 5,749,043 A | 5/1998 | Worthy |
| 5,751,282 A | 5/1998 | Girard et al. |
| 5,752,159 A | 5/1998 | Faust et al. |
| 5,752,160 A | 5/1998 | Dunn |
| 5,754,258 A | 5/1998 | Hanaya et al. |
| 5,754,771 A | 5/1998 | Epperson et al. |
| 5,754,939 A | 5/1998 | Herz et al. |
| 5,757,417 A | 5/1998 | Aras et al. |
| 5,758,257 A * | 5/1998 | Herz et al. ............. 725/116 |
| 5,758,258 A | 5/1998 | Shoff et al. |
| 5,758,259 A | 5/1998 | Lawler |
| 5,760,821 A | 6/1998 | Ellis et al. |
| 5,761,372 A | 6/1998 | Yoshinobu et al. |
| 5,761,601 A | 6/1998 | Nemirofsky et al. |
| 5,768,528 A | 6/1998 | Stumm |
| 5,774,170 A | 6/1998 | Hite et al. |
| 5,774,357 A | 6/1998 | Hoffberg et al. |
| 5,774,534 A | 6/1998 | Mayer |
| 5,774,887 A | 6/1998 | Wolff et al. |
| 5,778,182 A | 7/1998 | Cathey et al. |
| 5,781,226 A | 7/1998 | Sheehan |

(56) References Cited

U.S. PATENT DOCUMENTS

| | | | |
|---|---|---|---|
| 5,781,245 A | 7/1998 | Van Der Weij et al. |
| 5,781,246 A | 7/1998 | Alten et al. |
| 5,785,257 A | 7/1998 | Furuya et al. |
| 5,790,202 A | 8/1998 | Kummer et al. |
| 5,790,426 A | 8/1998 | Robinson |
| 5,790,835 A | 8/1998 | Case et al. |
| 5,790,935 A | 8/1998 | Payton |
| 5,793,364 A | 8/1998 | Bolanos et al. |
| 5,793,409 A | 8/1998 | Tetsumura |
| 5,793,438 A | 8/1998 | Bedard |
| 5,793,964 A | 8/1998 | Rogers et al. |
| 5,798,785 A | 8/1998 | Hendricks et al. |
| 5,801,747 A | 9/1998 | Bedard |
| 5,801,785 A | 9/1998 | Crump et al. |
| 5,801,787 A | 9/1998 | Schein et al. |
| 5,802,284 A | 9/1998 | Karlton et al. |
| 5,805,154 A | 9/1998 | Brown |
| 5,805,167 A | 9/1998 | van Cruyningen |
| 5,805,235 A | 9/1998 | Bedard |
| 5,805,763 A | 9/1998 | Lawler et al. |
| 5,805,804 A | 9/1998 | Laursen et al. |
| 5,808,608 A | 9/1998 | Young et al. |
| 5,808,694 A | 9/1998 | Usui et al. |
| 5,809,204 A | 9/1998 | Young et al. |
| 5,812,205 A | 9/1998 | Milnes et al. |
| 5,815,145 A | 9/1998 | Matthews, III |
| 5,815,671 A | 9/1998 | Morrison |
| 5,818,438 A | 10/1998 | Howe et al. |
| 5,818,439 A | 10/1998 | Nagasaka et al. |
| 5,818,441 A | 10/1998 | Throckmorton et al. |
| 5,818,541 A | 10/1998 | Matsuura et al. |
| 5,819,019 A | 10/1998 | Nelson |
| 5,819,156 A | 10/1998 | Belmont |
| 5,819,284 A | 10/1998 | Farber et al. |
| 5,822,123 A | 10/1998 | Davis et al. |
| 5,828,402 A | 10/1998 | Collings |
| 5,828,419 A | 10/1998 | Bruette et al. |
| 5,828,420 A | 10/1998 | Marshall et al. |
| 5,828,839 A | 10/1998 | Moncreiff |
| 5,828,945 A | 10/1998 | Klosterman |
| 5,830,068 A | 11/1998 | Brenner et al. |
| 5,838,314 A | 11/1998 | Neel et al. |
| 5,842,010 A | 11/1998 | Jain et al. |
| 5,842,199 A | 11/1998 | Miller et al. |
| 5,844,620 A | 12/1998 | Coleman et al. |
| 5,848,352 A | 12/1998 | Dougherty et al. |
| 5,848,396 A | 12/1998 | Gerace |
| 5,848,397 A | 12/1998 | Marsh et al. |
| 5,850,218 A | 12/1998 | LaJoie et al. |
| 5,862,292 A | 1/1999 | Kubota et al. |
| 5,867,226 A | 2/1999 | Wehmeyer et al. |
| 5,867,227 A | 2/1999 | Yamaguchi |
| 5,870,543 A | 2/1999 | Ronning |
| 5,872,588 A | 2/1999 | Aras et al. |
| 5,874,985 A | 2/1999 | Matthews, III |
| 5,875,108 A | 2/1999 | Hoffberg et al. |
| 5,880,768 A | 3/1999 | Lemmons et al. |
| 5,883,677 A | 3/1999 | Hofmann |
| 5,886,691 A | 3/1999 | Furuya et al. |
| 5,886,731 A | 3/1999 | Ebisawa |
| 5,892,498 A | 4/1999 | Marshall et al. |
| 5,892,535 A | 4/1999 | Allen et al. |
| 5,900,905 A | 5/1999 | Shoff et al. |
| 5,903,314 A | 5/1999 | Niijima et al. |
| 5,903,545 A | 5/1999 | Sabourin et al. |
| 5,903,816 A | 5/1999 | Broadwin et al. |
| 5,905,497 A | 5/1999 | Vaughn et al. |
| 5,907,323 A | 5/1999 | Lawler et al. |
| 5,907,366 A | 5/1999 | Farmer et al. |
| 5,914,746 A | 6/1999 | Matthews, III et al. |
| 5,917,481 A | 6/1999 | Rzeszewski et al. |
| 5,917,830 A | 6/1999 | Chen et al. |
| 5,918,014 A | 6/1999 | Robinson |
| 5,920,700 A | 7/1999 | Gordon et al. |
| 5,929,849 A | 7/1999 | Kikinis |
| 5,929,850 A | 7/1999 | Broadwin et al. |
| 5,936,679 A | 8/1999 | Kasahara et al. |
| 5,940,073 A | 8/1999 | Klosterman et al. |
| 5,940,572 A | 8/1999 | Balaban et al. |
| 5,945,988 A | 8/1999 | Williams et al. |
| 5,951,642 A | 9/1999 | Onoe et al. |
| 5,953,005 A | 9/1999 | Liu |
| 5,959,688 A | 9/1999 | Schein et al. |
| 5,960,411 A | 9/1999 | Hartman et al. |
| 5,973,683 A | 10/1999 | Cragun et al. |
| 5,974,222 A | 10/1999 | Yuen et al. |
| 5,977,964 A | 11/1999 | Williams et al. |
| 5,986,650 A | 11/1999 | Ellis et al. |
| 5,988,078 A | 11/1999 | Levine |
| 5,990,890 A | 11/1999 | Etheredge |
| 5,990,927 A | 11/1999 | Hendricks et al. |
| 5,999,912 A | 12/1999 | Wodarz et al. |
| 6,002,393 A | 12/1999 | Hite et al. |
| 6,002,394 A * | 12/1999 | Schein et al. ............ 725/39 |
| 6,002,444 A | 12/1999 | Marshall et al. |
| 6,005,562 A | 12/1999 | Shiga et al. |
| 6,005,565 A | 12/1999 | Legall et al. |
| 6,005,597 A | 12/1999 | Barrett et al. |
| 6,006,257 A | 12/1999 | Slezak |
| 6,008,802 A | 12/1999 | Iki |
| 6,008,803 A | 12/1999 | Rowe et al. |
| 6,011,546 A | 1/2000 | Bertram |
| 6,014,137 A | 1/2000 | Burns |
| 6,014,502 A | 1/2000 | Moraes |
| 6,016,141 A | 1/2000 | Knudson et al. |
| 6,018,372 A | 1/2000 | Etheredge |
| 6,018,768 A | 1/2000 | Ullman et al. |
| 6,020,883 A | 2/2000 | Herz et al. |
| 6,020,929 A | 2/2000 | Marshall et al. |
| 6,025,837 A | 2/2000 | Matthews, III et al. |
| 6,025,886 A | 2/2000 | Koda |
| 6,028,599 A | 2/2000 | Yuen et al. |
| 6,029,045 A | 2/2000 | Picco et al. |
| 6,029,176 A | 2/2000 | Cannon |
| 6,029,195 A | 2/2000 | Herz |
| 6,035,304 A | 3/2000 | Machida et al. |
| 6,047,317 A | 4/2000 | Bisdikian et al. |
| 6,049,824 A | 4/2000 | Simonin |
| 6,052,145 A | 4/2000 | Macrae et al. |
| 6,061,060 A | 5/2000 | Berry et al. |
| 6,061,082 A | 5/2000 | Park |
| 6,061,097 A | 5/2000 | Satterfield |
| 6,064,376 A | 5/2000 | Berezowski et al. |
| 6,064,980 A | 5/2000 | Jacobi et al. |
| 6,067,303 A | 5/2000 | Aaker et al. |
| 6,072,460 A | 6/2000 | Marshall et al. |
| 6,075,526 A | 6/2000 | Rothmuller |
| 6,075,551 A | 6/2000 | Berezowski et al. |
| 6,075,575 A | 6/2000 | Schein et al. |
| 6,078,348 A | 6/2000 | Klosterman et al. |
| 6,081,750 A | 6/2000 | Hoffberg et al. |
| 6,081,830 A | 6/2000 | Schindler |
| 6,088,722 A | 7/2000 | Herz et al. |
| 6,091,883 A | 7/2000 | Artigalas et al. |
| 6,098,065 A | 8/2000 | Skillen et al. |
| 6,108,042 A | 8/2000 | Adams et al. |
| 6,111,614 A | 8/2000 | Mugura et al. |
| 6,112,186 A | 8/2000 | Bergh et al. |
| 6,115,057 A | 9/2000 | Kwoh et al. |
| 6,118,492 A | 9/2000 | Milnes et al. |
| 6,119,098 A | 9/2000 | Guyot et al. |
| 6,119,101 A | 9/2000 | Peckover |
| 6,122,011 A | 9/2000 | Dias et al. |
| 6,125,230 A | 9/2000 | Yaginuma |
| 6,133,909 A | 10/2000 | Schein et al. |
| 6,141,003 A | 10/2000 | Chor et al. |
| 6,147,714 A | 11/2000 | Terasawa et al. |
| 6,147,715 A | 11/2000 | Yuen et al. |
| 6,151,059 A | 11/2000 | Schein et al. |
| 6,154,203 A | 11/2000 | Yuen et al. |
| 6,157,413 A | 12/2000 | Hanafee et al. |
| 6,160,545 A | 12/2000 | Eyer et al. |
| 6,160,546 A | 12/2000 | Thompson et al. |
| 6,160,570 A | 12/2000 | Sitnik |

(56) References Cited

U.S. PATENT DOCUMENTS

| | | | |
|---|---|---|---|
| 6,163,316 A | 12/2000 | Killian | |
| 6,169,542 B1 | 1/2001 | Hooks et al. | |
| 6,172,674 B1 | 1/2001 | Etheredge | |
| 6,172,677 B1 | 1/2001 | Stautner et al. | |
| 6,173,271 B1 | 1/2001 | Goodman et al. | |
| 6,177,931 B1 | 1/2001 | Alexander et al. | |
| 6,178,446 B1 | 1/2001 | Gerszberg et al. | |
| 6,181,335 B1 | 1/2001 | Hendricks et al. | |
| 6,186,443 B1 | 2/2001 | Shaffer | |
| 6,191,780 B1 | 2/2001 | Martin et al. | |
| 6,201,536 B1 | 3/2001 | Hendricks et al. | |
| 6,202,212 B1 | 3/2001 | Sturgeon et al. | |
| 6,209,129 B1 | 3/2001 | Carr et al. | |
| 6,209,130 B1 | 3/2001 | Rector, Jr. et al. | |
| 6,216,264 B1 | 4/2001 | Maze et al. | |
| 6,237,145 B1 | 5/2001 | Narasimhan et al. | |
| 6,239,794 B1 | 5/2001 | Yuen et al. | |
| 6,240,555 B1 | 5/2001 | Shoff et al. | |
| 6,253,203 B1 | 6/2001 | O'Flaherty et al. | |
| 6,256,071 B1 | 7/2001 | Hiroi | |
| 6,256,785 B1 | 7/2001 | Klappert et al. | |
| 6,257,268 B1 | 7/2001 | Hope et al. | |
| 6,262,721 B1 | 7/2001 | Tsukidate et al. | |
| 6,263,501 B1 | 7/2001 | Schein et al. | |
| 6,263,507 B1 | 7/2001 | Ahmad et al. | |
| 6,268,849 B1 | 7/2001 | Boyer et al. | |
| 6,275,268 B1 | 8/2001 | Ellis et al. | |
| 6,279,157 B1 | 8/2001 | Takasu | |
| 6,285,713 B1 | 9/2001 | Nakaya et al. | |
| 6,286,140 B1 | 9/2001 | Ivanyi | |
| 6,289,346 B1 | 9/2001 | Milewski et al. | |
| 6,298,482 B1 | 10/2001 | Seidman et al. | |
| 6,311,877 B1 | 11/2001 | Yang | |
| 6,312,336 B1 | 11/2001 | Handelman et al. | |
| 6,314,575 B1 | 11/2001 | Billock et al. | |
| 6,320,588 B1 | 11/2001 | Palmer et al. | |
| 6,323,911 B1 | 11/2001 | Schein et al. | |
| 6,323,931 B1 | 11/2001 | Fujita et al. | |
| 6,331,877 B1 | 12/2001 | Bennington et al. | |
| 6,341,195 B1 | 1/2002 | Mankovitz et al. | |
| 6,342,926 B1 | 1/2002 | Hanafee et al. | |
| 6,357,042 B2 | 3/2002 | Srinivasan et al. | |
| 6,363,525 B1 | 3/2002 | Dougherty et al. | |
| 6,366,890 B1 | 4/2002 | Usrey | |
| 6,381,582 B1 | 4/2002 | Walker et al. | |
| 6,388,714 B1 | 5/2002 | Schein et al. | |
| 6,389,593 B1 | 5/2002 | Yamagishi | |
| 6,392,710 B1 | 5/2002 | Gonsalves et al. | |
| 6,396,546 B1 | 5/2002 | Alten et al. | |
| 6,400,407 B1 | 6/2002 | Zigmond et al. | |
| 6,405,371 B1 | 6/2002 | Oosterhout et al. | |
| 6,408,437 B1 | 6/2002 | Hendricks et al. | |
| 6,411,308 B1 | 6/2002 | Blonstein et al. | |
| 6,412,110 B1 | 6/2002 | Schein et al. | |
| 6,418,556 B1 | 7/2002 | Bennington et al. | |
| 6,421,067 B1 | 7/2002 | Kamen et al. | |
| 6,437,836 B1 | 8/2002 | Huang et al. | |
| 6,446,261 B1 | 9/2002 | Rosser | |
| 6,453,471 B1 | 9/2002 | Klosterman | |
| 6,463,585 B1 | 10/2002 | Hendricks et al. | |
| 6,469,753 B1 | 10/2002 | Klosterman et al. | |
| 6,470,497 B1 | 10/2002 | Ellis et al. | |
| 6,477,579 B1 | 11/2002 | Kunkel et al. | |
| 6,477,705 B1 | 11/2002 | Yuen et al. | |
| 6,483,523 B1 | 11/2002 | Feng | |
| 6,486,920 B2 | 11/2002 | Arai et al. | |
| 6,493,876 B1 | 12/2002 | DeFreese et al. | |
| 6,498,895 B2 | 12/2002 | Young et al. | |
| 6,505,348 B1 | 1/2003 | Knowles et al. | |
| 6,515,680 B1 | 2/2003 | Hendricks et al. | |
| 6,516,323 B1 | 2/2003 | Kamba | |
| 6,530,082 B1 | 3/2003 | Del Sesto et al. | |
| 6,539,548 B1 | 3/2003 | Hendricks et al. | |
| 6,545,722 B1 | 4/2003 | Schultheiss et al. | |
| 6,546,556 B1 | 4/2003 | Kataoka et al. | |
| 6,553,178 B2 | 4/2003 | Abecassis | |
| 6,564,378 B1 | 5/2003 | Satterfield et al. | |
| 6,564,379 B1 | 5/2003 | Knudson et al. | |
| 6,564,381 B1 * | 5/2003 | Hodge et al. | 725/97 |
| 6,571,390 B1 | 5/2003 | Dunn et al. | |
| 6,574,424 B1 | 6/2003 | Dimitri et al. | |
| 6,588,013 B1 | 7/2003 | Lumley et al. | |
| 6,600,364 B1 | 7/2003 | Liang et al. | |
| 6,600,503 B2 | 7/2003 | Stautner et al. | |
| 6,606,128 B2 | 8/2003 | Hanafee et al. | |
| 6,622,306 B1 | 9/2003 | Kamada | |
| 6,631,523 B1 | 10/2003 | Matthews et al. | |
| 6,637,029 B1 | 10/2003 | Maissel et al. | |
| 6,651,251 B1 | 11/2003 | Shoff et al. | |
| 6,660,503 B2 | 12/2003 | Kierulff | |
| 6,661,468 B2 | 12/2003 | Alten et al. | |
| 6,665,869 B1 | 12/2003 | Ellis et al. | |
| 6,687,906 B1 | 2/2004 | Yuen et al. | |
| 6,698,020 B1 | 2/2004 | Zigmond et al. | |
| 6,704,931 B1 | 3/2004 | Schaffer et al. | |
| 6,732,369 B1 | 5/2004 | Leftwich et al. | |
| 6,738,978 B1 | 5/2004 | Hendricks et al. | |
| 6,742,183 B1 | 5/2004 | Reynolds et al. | |
| 6,751,800 B1 | 6/2004 | Fukuda et al. | |
| 6,756,997 B1 | 6/2004 | Ward, III et al. | |
| 6,757,906 B1 | 6/2004 | Look et al. | |
| 6,792,618 B1 | 9/2004 | Bendinelli et al. | |
| 6,799,326 B2 | 9/2004 | Boylan, III et al. | |
| 6,799,327 B1 | 9/2004 | Reynolds et al. | |
| 6,828,993 B1 | 12/2004 | Hendricks et al. | |
| 6,857,131 B1 | 2/2005 | Yagawa et al. | |
| 6,868,551 B1 | 3/2005 | Lawler et al. | |
| 6,938,208 B2 | 8/2005 | Reichardt | |
| 6,973,669 B2 | 12/2005 | Daniels | |
| 6,983,478 B1 | 1/2006 | Grauch et al. | |
| 7,003,792 B1 | 2/2006 | Yuen | |
| 7,028,326 B1 | 4/2006 | Westlake et al. | |
| 7,039,935 B2 | 5/2006 | Knudson et al. | |
| 7,047,550 B1 | 5/2006 | Yasukawa et al. | |
| 7,051,351 B2 | 5/2006 | Goldman et al. | |
| 7,069,576 B1 | 6/2006 | Knudson et al. | |
| 7,100,185 B2 | 8/2006 | Bennington et al. | |
| 7,117,518 B1 | 10/2006 | Takahashi et al. | |
| 7,185,355 B1 | 2/2007 | Ellis et al. | |
| 7,187,847 B2 | 3/2007 | Young et al. | |
| 7,266,833 B2 | 9/2007 | Ward, III et al. | |
| 7,287,267 B2 | 10/2007 | Knudson et al. | |
| 7,293,276 B2 | 11/2007 | Phillips et al. | |
| 7,328,450 B2 | 2/2008 | Macrae et al. | |
| 7,392,532 B2 | 6/2008 | White et al. | |
| 7,480,929 B2 | 1/2009 | Klosterman et al. | |
| 7,487,528 B2 | 2/2009 | Satterfield et al. | |
| 7,487,529 B1 | 2/2009 | Orlick | |
| 7,493,641 B2 | 2/2009 | Klosterman et al. | |
| 7,503,055 B2 | 3/2009 | Reynolds et al. | |
| 7,634,786 B2 | 12/2009 | Knee et al. | |
| 7,665,109 B2 | 2/2010 | Matthews, III et al. | |
| 7,779,437 B2 | 8/2010 | Barton | |
| 2001/0001160 A1 | 5/2001 | Shoff et al. | |
| 2001/0019338 A1 | 9/2001 | Roth | |
| 2001/0029610 A1 | 10/2001 | Corvin et al. | |
| 2001/0042246 A1 | 11/2001 | Yuen et al. | |
| 2001/0047298 A1 | 11/2001 | Moore et al. | |
| 2001/0049820 A1 | 12/2001 | Barton | |
| 2001/0054181 A1 | 12/2001 | Corvin | |
| 2002/0042913 A1 | 4/2002 | Ellis et al. | |
| 2002/0042914 A1 | 4/2002 | Walker et al. | |
| 2002/0042918 A1 | 4/2002 | Townsend et al. | |
| 2002/0049973 A1 | 4/2002 | Alten et al. | |
| 2002/0059602 A1 | 5/2002 | Macrae et al. | |
| 2002/0073424 A1 | 6/2002 | Ward, III et al. | |
| 2002/0083439 A1 | 6/2002 | Eldering | |
| 2002/0092017 A1 | 7/2002 | Klosterman et al. | |
| 2002/0120933 A1 | 8/2002 | Knudson et al. | |
| 2002/0124249 A1 | 9/2002 | Shintani et al. | |
| 2003/0005432 A1 | 1/2003 | Ellis et al. | |
| 2003/0005445 A1 | 1/2003 | Schein et al. | |
| 2003/0110499 A1 | 6/2003 | Knudson et al. | |
| 2003/0135853 A1 | 7/2003 | Goldman et al. | |

(56) References Cited

U.S. PATENT DOCUMENTS

| | | | |
|---|---|---|---|
| 2003/0163813 | A1 | 8/2003 | Klosterman et al. |
| 2003/0164858 | A1 | 9/2003 | Klosterman et al. |
| 2003/0177494 | A1 | 9/2003 | Satterfield et al. |
| 2003/0188310 | A1 | 10/2003 | Klosterman et al. |
| 2003/0188311 | A1 | 10/2003 | Yuen et al. |
| 2003/0196201 | A1 | 10/2003 | Schein et al. |
| 2003/0196203 | A1 | 10/2003 | Ellis et al. |
| 2003/0204847 | A1 | 10/2003 | Ellis et al. |
| 2003/0208756 | A1 | 11/2003 | Macrae et al. |
| 2003/0208758 | A1 | 11/2003 | Schein et al. |
| 2004/0003407 | A1 | 1/2004 | Hanafee et al. |
| 2004/0049787 | A1 | 3/2004 | Maissel et al. |
| 2004/0078809 | A1 | 4/2004 | Drazin |
| 2004/0111742 | A1 | 6/2004 | Hendricks et al. |
| 2004/0139465 | A1 | 7/2004 | Matthews et al. |
| 2004/0168189 | A1 | 8/2004 | Reynolds et al. |
| 2004/0194131 | A1 | 9/2004 | Ellis et al. |
| 2004/0194138 | A1 | 9/2004 | Boylan, III et al. |
| 2005/0010949 | A1 | 1/2005 | Ward et al. |
| 2005/0015804 | A1 | 1/2005 | LaJoie et al. |
| 2005/0097622 | A1 | 5/2005 | Zigmond et al. |
| 2005/0155056 | A1 | 7/2005 | Knee et al. |
| 2005/0157217 | A1 | 7/2005 | Hendricks |
| 2005/0198668 | A1 | 9/2005 | Yuen et al. |
| 2005/0204382 | A1 | 9/2005 | Ellis |
| 2005/0216936 | A1 | 9/2005 | Knudson |
| 2005/0229214 | A1 | 10/2005 | Young et al. |
| 2005/0244138 | A1 | 11/2005 | O'Connor et al. |
| 2005/0278741 | A1 | 12/2005 | Robarts et al. |
| 2005/0283796 | A1 | 12/2005 | Flickinger |
| 2006/0248555 | A1 | 11/2006 | Eldering |
| 2007/0016926 | A1 | 1/2007 | Ward et al. |
| 2007/0033613 | A1 | 2/2007 | Ward et al. |
| 2007/0162934 | A1 | 7/2007 | Roop et al. |
| 2007/0186240 | A1 | 8/2007 | Ward et al. |
| 2008/0127265 | A1 | 5/2008 | Ward et al. |
| 2008/0127266 | A1 | 5/2008 | Ward et al. |
| 2008/0178221 | A1 | 7/2008 | Schein et al. |
| 2008/0184315 | A1 | 7/2008 | Ellis et al. |
| 2008/0189744 | A1 | 8/2008 | Schein et al. |
| 2008/0235725 | A1 | 9/2008 | Hendricks |

FOREIGN PATENT DOCUMENTS

| | | |
|---|---|---|
| AU | 733993 | 2/1999 |
| AU | 760568 B2 | 5/2003 |
| AU | 765648 B2 | 9/2003 |
| CA | 1030505 | 5/1978 |
| CA | 1187197 | 5/1985 |
| CA | 1188811 | 6/1985 |
| CA | 1196082 | 10/1985 |
| CA | 1200911 | 2/1986 |
| CA | 2151458 | 6/1994 |
| CA | 2164608 | 12/1994 |
| CA | 2285645 A1 | 7/1998 |
| CA | 2297039 A1 | 1/1999 |
| CA | 2312326 | 6/1999 |
| CA | 2322217 A1 | 9/1999 |
| CA | 2324278 A1 | 11/1999 |
| CA | 2513282 A1 | 11/1999 |
| CN | 1555191 | 12/2004 |
| DE | 2918846 | 11/1980 |
| DE | 3246225 | 6/1984 |
| DE | 3337204 | 4/1985 |
| DE | 3621263 | 7/1988 |
| DE | 3702220 A1 | 8/1988 |
| DE | 3909334 | 9/1990 |
| DE | 41 43 074 A1 | 7/1992 |
| DE | 42 01 031 | 7/1993 |
| DE | 44 40 419 | 5/1996 |
| DE | 19531121 A1 | 2/1997 |
| DE | 19740079 A1 | 3/1999 |
| DE | 19931046 | 1/2001 |
| DE | 42 90 947 B4 | 11/2006 |
| EP | 0 222 025 A1 | 5/1987 |
| EP | 0 229 526 A2 | 7/1987 |
| EP | 0 239 884 | 10/1987 |
| EP | 0337336 A2 | 10/1989 |
| EP | 0339675 | 11/1989 |
| EP | 0 393 555 | 10/1990 |
| EP | 0 396 062 | 11/1990 |
| EP | 0 401 930 | 12/1990 |
| EP | 0 408 892 | 1/1991 |
| EP | 0 420 123 | 4/1991 |
| EP | 0 424 648 | 5/1991 |
| EP | 0 444 496 B1 | 9/1991 |
| EP | 0 447 968 A2 | 9/1991 |
| EP | 0488379 | 6/1992 |
| EP | 497 235 | 8/1992 |
| EP | 0 550 911 | 12/1992 |
| EP | 0 532 322 | 3/1993 |
| EP | 0 560 593 A2 | 9/1993 |
| EP | 0 572 090 B | 12/1993 |
| EP | 0 620 689 | 10/1994 |
| EP | 0624039 A2 | 11/1994 |
| EP | 0 673 164 | 9/1995 |
| EP | 0682452 A2 | 11/1995 |
| EP | 0 711 076 | 5/1996 |
| EP | 0 725 539 | 8/1996 |
| EP | 0 752 767 A2 | 1/1997 |
| EP | 0 753 964 A1 | 1/1997 |
| EP | 0 762 751 | 3/1997 |
| EP | 0 772 360 A2 | 5/1997 |
| EP | 0 774 866 | 5/1997 |
| EP | 0 775 417 B1 | 5/1997 |
| EP | 0 784 405 A2 | 7/1997 |
| EP | 0 805 594 B1 | 11/1997 |
| EP | 0 806 111 A1 | 11/1997 |
| EP | 0 822 718 A1 | 2/1998 |
| EP | 0 880 856 B1 | 2/1998 |
| EP | 0 784 405 A3 | 3/1998 |
| EP | 0 827 340 A2 | 3/1998 |
| EP | 0 834 798 | 4/1998 |
| EP | 0 848 554 A2 | 6/1998 |
| EP | 0 849 948 A2 | 6/1998 |
| EP | 0 851 681 A1 | 7/1998 |
| EP | 0 852 442 A2 | 7/1998 |
| EP | 0 854 645 A2 | 7/1998 |
| EP | 0854654 | 7/1998 |
| EP | 0 905 985 A2 | 3/1999 |
| EP | 0 924 927 A2 | 6/1999 |
| EP | 0 935 393 A2 | 8/1999 |
| EP | 0 944 253 A1 | 9/1999 |
| EP | 0944253 A1 | 9/1999 |
| EP | 0 963 119 A1 | 12/1999 |
| EP | 0 988 876 | 3/2000 |
| EP | 1 058 999 A1 | 12/2000 |
| EP | 1 095 504 B1 | 5/2001 |
| EP | 0 822 718 B1 | 6/2002 |
| EP | 1036466 | 3/2003 |
| FR | 2662895 | 12/1991 |
| GB | 1 554 411 | 10/1979 |
| GB | 2034995 | 6/1980 |
| GB | 2126002 | 3/1984 |
| GB | 2185670 | 7/1987 |
| GB | 2217144 | 10/1989 |
| GB | 2256546 | 12/1992 |
| GB | 2305049 A | 3/1997 |
| GB | 2309134 A | 7/1997 |
| HK | 1035285 | 3/2005 |
| JP | 58-137334 | 8/1983 |
| JP | 58137344 | 8/1983 |
| JP | 58-196738 | 11/1983 |
| JP | 58 210776 A | 12/1983 |
| JP | 59-141878 | 8/1984 |
| JP | 60-061935 | 4/1985 |
| JP | 61-050470 | 3/1986 |
| JP | 61-074476 | 4/1986 |
| JP | 62-060370 | 3/1987 |
| JP | 62-060384 | 3/1987 |
| JP | 63 234679 A | 9/1988 |
| JP | 01-307944 | 12/1989 |
| JP | 02-048879 | 2/1990 |

(56) References Cited

FOREIGN PATENT DOCUMENTS

| | | |
|---|---|---|
| JP | 03063990 | 3/1991 |
| JP | 04-227380 | 8/1992 |
| JP | 4340258 A | 11/1992 |
| JP | 05 122692 | 5/1993 |
| JP | 05-183826 | 7/1993 |
| JP | 05-284437 | 10/1993 |
| JP | 06-021907 | 1/1994 |
| JP | 07-020254 | 1/1995 |
| JP | 07-050259 | 2/1995 |
| JP | 07-076592 | 3/1995 |
| JP | 07-123326 | 5/1995 |
| JP | 07-147657 | 6/1995 |
| JP | 07-284033 A | 10/1995 |
| JP | 07-288759 | 10/1995 |
| JP | 07-321748 | 12/1995 |
| JP | 08-32528 | 2/1996 |
| JP | 08-32538 | 2/1996 |
| JP | 08-125497 | 5/1996 |
| JP | 08-251122 | 9/1996 |
| JP | 08-275077 | 10/1996 |
| JP | 08-331546 A | 12/1996 |
| JP | 09-037172 | 2/1997 |
| JP | 0903751 | 2/1997 |
| JP | 9037151 | 2/1997 |
| JP | 9037168 | 2/1997 |
| JP | 09-102827 | 4/1997 |
| JP | 09 247565 | 9/1997 |
| JP | 92-44475 A | 9/1997 |
| JP | 9-261609 A | 10/1997 |
| JP | 10-501936 | 2/1998 |
| JP | 07023356 | 4/1998 |
| JP | 10-143340 | 5/1998 |
| JP | 10-143349 | 5/1998 |
| JP | 10-512420 | 11/1998 |
| JP | 2838892 | 12/1998 |
| JP | 2001-213595 | 8/2001 |
| JP | 2002-279969 | 9/2002 |
| JP | 4062577 | 3/2008 |
| JP | 4510282 | 7/2010 |
| WO | WO-86/01359 A1 | 2/1986 |
| WO | WO 86/01962 | 3/1986 |
| WO | WO 87/03766 | 6/1987 |
| WO | WO 88/04057 | 6/1988 |
| WO | WO 88/04507 | 6/1988 |
| WO | WO 89/02682 | 3/1989 |
| WO | WO 89/03085 | 4/1989 |
| WO | WO 89/12370 | 12/1989 |
| WO | WO 90/01243 | 2/1990 |
| WO | WO 90/15507 | 12/1990 |
| WO | WO 91/00670 | 1/1991 |
| WO | WO 91-18476 | 11/1991 |
| WO | WO 92/04801 | 3/1992 |
| WO | WO 93/04473 | 3/1993 |
| WO | WO 93/05452 | 3/1993 |
| WO | WO 93/11638 | 6/1993 |
| WO | WO 93/11639 | 6/1993 |
| WO | WO 93/11640 | 6/1993 |
| WO | WO 93/23957 | 11/1993 |
| WO | WO 94/13107 | 6/1994 |
| WO | WO 94/14281 | 6/1994 |
| WO | WO 94/14282 | 6/1994 |
| WO | WO 94/14283 | 6/1994 |
| WO | WO 94/14284 | 6/1994 |
| WO | WO 94/21085 | 9/1994 |
| WO | WO 94/23383 | 10/1994 |
| WO | WO 94/29811 | 12/1994 |
| WO | WO 95/01056 | 1/1995 |
| WO | WO 95/01058 | 1/1995 |
| WO | WO 95/01059 | 1/1995 |
| WO | WO 95/06389 | 3/1995 |
| WO | WO 95/07003 | 3/1995 |
| WO | WO 95/10910 | 4/1995 |
| WO | WO 95/15649 | 6/1995 |
| WO | WO 95/15657 | 6/1995 |
| WO | WO 95/15658 | 6/1995 |
| WO | WO-95/16568 A1 | 6/1995 |
| WO | WO 95/19092 A1 | 7/1995 |
| WO | WO-95/26608 A1 | 10/1995 |
| WO | WO 95/28055 | 10/1995 |
| WO | WO-95/28799 A1 | 10/1995 |
| WO | WO 95/30961 | 11/1995 |
| WO | WO 95/31069 | 11/1995 |
| WO | WO 95/32583 | 11/1995 |
| WO | WO 95/32585 | 11/1995 |
| WO | WO 96/07270 A | 3/1996 |
| WO | WO 96/08109 | 3/1996 |
| WO | WO 96/08113 | 3/1996 |
| WO | WO 96/09721 | 3/1996 |
| WO | WO 96/13932 A1 | 5/1996 |
| WO | WO 96/13935 | 5/1996 |
| WO | WO 96/17467 | 6/1996 |
| WO | WO 96/17473 | 6/1996 |
| WO | WO 96/21990 | 7/1996 |
| WO | WO 96/26605 | 8/1996 |
| WO | WO-9627270 A1 | 9/1996 |
| WO | WO-9627982 | 9/1996 |
| WO | WO 96/31980 | 10/1996 |
| WO | WO 96/34467 | 10/1996 |
| WO | WO 96/34486 | 10/1996 |
| WO | WO 96/34491 | 10/1996 |
| WO | WO 96/38799 | 12/1996 |
| WO | WO 96/41471 | 12/1996 |
| WO | WO 96/41477 | 12/1996 |
| WO | WO 96/41478 | 12/1996 |
| WO | WO-97/02702 A2 | 1/1997 |
| WO | WO 97/04595 | 2/1997 |
| WO | WO 97/07656 | 3/1997 |
| WO | WO-97/12486 | 4/1997 |
| WO | WO 97/13368 | 4/1997 |
| WO | WO 97/17774 | 5/1997 |
| WO | WO 97/18675 | 5/1997 |
| WO | WO 97/26612 | 7/1997 |
| WO | WO 97/31480 | 8/1997 |
| WO | WO-9734414 | 9/1997 |
| WO | WO 97/41673 | 11/1997 |
| WO | WO 97/42763 | 11/1997 |
| WO | WO 97/48230 | 12/1997 |
| WO | WO 97/49237 | 12/1997 |
| WO | WO 97/49241 | 12/1997 |
| WO | WO 97/49242 | 12/1997 |
| WO | WO 98/06219 | 2/1998 |
| WO | WO 98/10589 | 3/1998 |
| WO | WO 98/16062 | 4/1998 |
| WO | WO 98/17064 | 4/1998 |
| WO | WO 98/20675 | 5/1998 |
| WO | WO 98/26569 | 6/1998 |
| WO | WO 98/26584 | 6/1998 |
| WO | WO 98/27723 | 6/1998 |
| WO | WO 98/28906 | 7/1998 |
| WO | WO 98/31148 | 7/1998 |
| WO | WO-98/37695 | 8/1998 |
| WO | WO 98/41020 | 9/1998 |
| WO | WO 98/43183 | 10/1998 |
| WO | WO 98/47279 | 10/1998 |
| WO | WO-98/48566 A2 | 10/1998 |
| WO | WO 98/56172 | 12/1998 |
| WO | WO-98/56712 A1 | 12/1998 |
| WO | WO-99/01984 A1 | 1/1999 |
| WO | WO 99/04561 | 1/1999 |
| WO | WO 99/07142 | 2/1999 |
| WO | WO 99/11060 | 3/1999 |
| WO | WO-99/14947 | 3/1999 |
| WO | WO 99/18722 | 4/1999 |
| WO | WO 99/22502 | 5/1999 |
| WO | WO 99/29109 | 6/1999 |
| WO | WO 99/30491 | 6/1999 |
| WO | WO 99/31480 | 6/1999 |
| WO | WO 99/45700 | 9/1999 |
| WO | WO-99/45701 A1 | 9/1999 |
| WO | WO 99/45702 | 9/1999 |
| WO | WO 99/52285 | 10/1999 |
| WO | WO 99/56466 | 11/1999 |
| WO | WO 99/56473 | 11/1999 |
| WO | WO 99/60783 | 11/1999 |

(56) References Cited

FOREIGN PATENT DOCUMENTS

| WO | WO 99/60789 | 11/1999 |
|---|---|---|
| WO | WO 00/04706 | 1/2000 |
| WO | WO-00/04708 A1 | 1/2000 |
| WO | WO 00/05889 | 2/2000 |
| WO | WO 00/11865 | 3/2000 |
| WO | WO-00/13415 A2 | 3/2000 |
| WO | WO 00/16548 | 3/2000 |
| WO | WO 00/27122 | 5/2000 |
| WO | WO 00/28734 | 5/2000 |
| WO | WO 00/33160 | 6/2000 |
| WO | WO 00/33224 | 6/2000 |
| WO | WO 00/33560 | 6/2000 |
| WO | WO-00/33573 A1 | 6/2000 |
| WO | WO 00/49801 | 8/2000 |
| WO | WO 00/79798 | 12/2000 |
| WO | WO-01/01677 A1 | 1/2001 |
| WO | WO 01/06784 | 1/2001 |
| WO | WO 01/15438 | 3/2001 |
| WO | WO 01/35662 | 5/2001 |
| WO | WO 01/89213 | 11/2001 |
| WO | WO 02/31731 | 4/2002 |
| WO | WO-02/084992 A2 | 10/2002 |

OTHER PUBLICATIONS

U.S. Appl. No. 09/217,100, filed Dec. 16, 1998, Reynolds et al.
U.S. Appl. No. 09/330,792, filed Jun. 11, 1999, Knudson et al.
U.S. Appl. No. 09/332,244, filed Jun. 11, 1999, Ellis et al.
U.S. Appl. No. 09/356,268, filed Jul. 16, 1999, Rudnick et al.
272OR Satellite Receiver User's Guide, *General Instrument*, 1991, pp. 58-61.
"Addressable Converters: A New Development at CableData," *Via Cable*, vol. 1, No. 12, Dec. 1981.
Advertisement for "TV Decisions," Cable Vision, Aug. 4, 1986.
Alexander, Michael "Visualizing cleared-off desktops," Computerworld, May 6, 1991, p. 20.
Antonoff, M., "Stay Tuned for Smart TV," Popular Science, Nov. 1990, pp. 62-65.
Baer, R.H, "Innovative Add-On TV Products," IEEE Transactions on Consumer Electronics, vol. CE-25, Nov. 1979, pp. 765-771.
"Bell Atlantic Buys Cable TV Company for $22bn," *Financial Times* (London), Oct. 14, 1993 p. 65.
Bensch, U., "VPV Videotext Programs Videorecorder," IEEE Paper, Jun. 1988, pp. 788-792.
Bestler, Caitlin "Flexible Data Structures and Interface Rituals for Rapid Development of OSD Applications," Proceedings from the Eleven Technical Sessions, 42nd Annual Convention and Exposition and Exploration of the NCTA, San Francisco, CA Jun. 6-9, 1993, pp. 223-236. Jun. 6, 1993.
Brochure, "A New Approach to Addressability," CableData, undated.
Brochure, "Westar and Videotoken Network Present the CableComputer," Revised Aug. 15, 1985 (Plainitff's 334).
Brochure, Time Inc.,"Now, Through the Advances of the Computer Age, You Can Get the Information You Want, When You Want It. Instantly and Conveniently, on Your Home TV Screen," Time Teletext, Time Video Information Services, Inc., undated (V 79167-79175).
Brochure, VTN "Videotoken Network, New Dimension Television," Dec. 1985 (Plaintiff's Exhibit 313).
Brugliera, Vito., "Digital On-Screen Display—A New Technology for the Consumer Interface," Symposium Record Cable TV Sessions of the 18th International Television Symposium & Technical Exhibition—Montreux, Switzerland, Jun. 10-15, 1993, pp. 571-586.
Cable Computer User's Guide, Rev. 1, Dec. 1985 (Plaintiff's Exhibit 289).
"Cable Television Equipment," Jerrold Communications Publication, dated 1992 and 1993, pp. 8-2.1 to 8-6 and 8-14.1 to 8-14.3.
Carne, E.B., "The Wired Household," IEEE Spectrum, vol. 16 No. 10, Oct. 1979, pp. 61-66.

Chan, Patrick P., "Learning Considerations in User Interface Design: The Room Model," Publication of the Software Portability Laboratory, University of Waterloo, Ontario, Canada, Jul. 1984.
Christodoulakis, Steven and Graham, Stephen "Browsing Within Time-Driven Multimedia Documents," publication of the Institute for Computer Research, University of Waterloo, Waterloo, Ontario, Canada Jul. 1988 pp. 219-227.
"Computer Network: Current Status and Outlook on Leading Science and Technology," Bureau of Science & Technology (Japan), vol. 1, Dec. 1986.
Cox, J. et al, "Extended Services in a Digital Compression System," *Proceedings from Eleven Technical Sessions: 42nd Annual Convention and Exposition of the National Cable Television Association*, Jun. 1993, pp. 185-191.
Creation-Modification of the Audio Signal Processor Setup for a PC Audio Editor, IBM Technical Disclosure Bulletin, vol. 30, No. 10, Mar. 1988, pp. 367-376.
"D2B-Home Bus Fur Audio and Video," Selektor, Apr. 1990, pp. 10, 12.
Damouny, N.G., "Teletext Decoders—Keeping Up With the Latest Advances," IEEE Transactions on Consumer Electronics, vol. CE-30, No. 3, Aug. 1984, pp. 429-435.
"Dial M for Movie", Funkschau 11-94 Perspektiven, Video on Demand, pp. 78-79. (English language translation attached).
"Digital Video Broadcasting (DVB); DVB specification for data broadcasting," European Telecommunication Standards Institute, Draft EN 301 192 V1.2.1 (Jan. 1999).
DiRosa, S. "BIGSURF Netguide", Jul. 1995, vol. 3.1 (Sections 18,21, and 28—renumbered as pp. 1-27).
"'Duck Tales,'(1987)[TV Series 1987-1990]," Internet Movie Database (IMDB) [Retrieved on Apr. 7, 2007].
Edwardson, S.M., & Gee, A., "CEEFAX: A Proposed New Broadcasting Service," Journal of the SMPTE, Jan. 1974, vol. 83 No. 1, pp. 14-19.
Eitz, Gerhard, "Zukünftige Informations-und Datenangebote beim digitalen Femsehen—EPG Und 'Lesezeichen'," RTM Rundfunktechnische Mitteilungen, Jun. 1997, vol. 41, pp. 67-72.
"Enhanced Content Specification," "ATVEF," from the internet at http:—www.atvef.com-library-spec.html, printed Aug. 22, 2001, the document bears a Copyright date of 1998, 1999, 2000.
European Telecommunication Standard, Electronic Programme Guide (EPG); Protocol for a TV Guide using electronic data transmission, by European Telecommunication Standards Institute, Valbonne, France, publication No. ETS 300.707 date of May 1997.
"Facsimile Transmission," NHK Research Monthly Report, Dec. 1987(Unknown author).
Hartwig, Rautenberg, Bollmann, "Broadcasting and Processing of Program Guides for Digital TV," SMPTE Journal, pp. 727-732, Oct. 1997.
Hedger, J., "Telesoftware: Home Computing Via Broadcast Teletext," IEEE Transactions on Consumer Electronics, vol. CE-25, No. 3, Jul. 1979, pp. 279-287.
Hiroshi Ishii et al, "Clearface: Translucent Multiuser Interface for TeamWorkStation," ECSCW, Sep. 1991, pp. 6-10.
Hiroshi Ishii et al, "Toward an Open Shared Workspace: Computer and Video Fusion Approach of Team Workstation," Communications of the ACM, Dec. 1991, vol. 34 No. 12, pp. 37-50.
Hirotada Ueda et al, "Impact: An Interactive Natural-Motion-Picture Dedicated Multi-Media Authoring System," Communications of the ACM, Mar. 1991, pp. 343-350.
Hofmann, Neumann, Oberlies & Schadwinkel, "Videotext Programmiert Videorecorder," Rundfunktechnischen Mitteilungen, (Broadcast Engineering Reports), vol. 26 No. 6, pp. 254-257, Nov.-Dec. 1982.
Installation Guide, "Getting Started 1" Manual, and Remote Control "Quick Reference Guide", undated.
Instructional Manual, "Sonic the Hedgehoge," Sega of America, 1992.
"Interactive Computer Conference Server," IBM Technical Bulletin, vol. 34, No. 7A, Dec. 1991, pp. 375-377.
"Interface Device for Conventional TVs to Improve Functionality," IBM Technical Disclosure Bulletin, vol. 36, No. 7, Jul. 1993, pp. 53-54.

(56) References Cited

OTHER PUBLICATIONS

James Sorce, David Fay, Brian Raila and Robert Virzi, "Designing a Broadband Residential Entertainment Service: A Case Study," GTE Laboratories Incorporated, undated, pp. 141-148.
James, A., "Oracle—Broadcasting the Written Word," Wireless World, Jul. 1973, vol. 79 No. 1453, pp. 314-316.
Judice, C.N., "Move Over Cable, Here Comes Video Via Voice Lines," Network World, Sep. 1986, p. 26.
Karstad, K.,"Microprocessor Control for Color-TV Receivers," IEEE Transactions on Consumer Electronics, vol. CE-26, May 1980, pp. 149-155.
Kornhaas, W., "Von der Textprogrammierung uber TOP zum Archivsystem," Radio Fernsehen Elektronik, vol. 40, No. 8, Aug. 30, 1991, pp. 465-468, XP 000240875 Veb Verlag Technik. Berlin, DE ISSN: 1436-1574.
Listing of computer code for operating system within the Cable Computer in 1985 (Plaintiff's Exhibit 298).
Listing of computer code for Video HTU Program (Plaintiff's Exhibit 299), undated.
"Lists> What's on Tonite! TV Listings (fwd)," Internet article (On line), Jan. 28, 1995, XP 002378869 [Retrieved on Apr. 28, 2006].
Lowenstein, R.L. and Aller, H.E., "The Inevitable March of Videotex," Technology Review, vol. 88, Oct. 1985, p. 22.
M-A-COM, Inc., "Videocipher II Satellite Descrambler Owner's Manual," dated Feb. 1986, pp. 1-24.
Mack Daily, "Addressable Decoder with Downloadable Operation," Proceedings from the Eleven Technical Sessions, 42nd Annual Convention and Exposition of the NCTA, Jun. 6-9, 1993, pp. 82-89.
Mannes, G., "Smart Screens: Development of Personal Navigation Systems for TV Viewers," Video Magazine, Dec. 1993.
Mar. 19, 1985 letter from G. Knapp of CableData to R. Hansen of Weststar Communications, Inc. (Plaintiff's Exhibit 325).
Markowitz, A. "Companies Jump on Interactive Bandwagon," *Discount Store News*, Dec. 6, 1993, pp. 4 and 131.
McKenzie, G.A., "Oracle—An Information Broadcasting Service Using Data Transmission in the Vertical Interval," Journal of the SMPTE, Jan. 1974, vol. 83 No. 1, pp. 6-10.
Merrell,R.G., "Tac Timer," 1986 NCTA Technical Papers, pp. 203-206.
"MSI Datacasting Systems," TV Communications Journal, Jan. 1973.
Neumann, Andreas, "WDR Online Aufbau und Perspektiven Automatisierter Online-Dienste im WDR," RTM Rundfunktechnische Mitteilungen, vol. 41, pp. 56-66, Jun. 1997.
No subject, "Tom Schauer (tschauer@moscow.com)Thu, Sep. 28, 1995 16:46:48-700," XP-002378870 [Retrieved from the Internet Apr. 28, 2006].
Office Action dated Sep. 8, 2006 re U.S. Appl. No. 10/453,388.
"Open TV fur interaktives Fernsehen," Trend and Technik, 9-95 RFE, p. 100. (English language translation attached).
"Open TV Launches OpenStreamer™ Technology for Broadcasters to Deliver First Ever Real-Time Digital Interactive Television," from the internet at http:--www.opentv.com-news-openstreamer_press_final.htm, printed on Jun. 28, 1999, the document bears a copyright date of 1999.
Pfister, Larry T., "Teletext: Its Time Has Come," Prepared for the IGC Videotext—Teletext Conference, Andover, Massachusettes, Dec. 14, 1982, pp. 1-11.
Prevue Guide Brochure, Spring 1994.
"Prevue Networks and OpenTV(R) Agree to Work Together on Deploying Interactive Program Guides Worldwide," from the internet at http:--www.opentv.com-news-prevuefinal.htm, printed on Jun. 28, 1999.
"Probe XL Brochure, Auto Tote Systems Inc.," (Newark, Delaware) (undated) 57 pgs.
Prodigy Launches Interactive TV Listing, Apr. 22, 1994 public Broadcasting Report.
Rayers, D.J., "Telesoftware by Teletext," 1984 IEEE Conference Papers, vol. 240, p. 323.
"Rewind, reply and unwind with new high-tech TV devices," by Lawrence J. Magid, *LA Times*. This document was printed from the internet on Jun. 6, 1999 and bears a date of May 19, 1999.
Rogers, "Telcos vs. Cable TV : The Global View With Markets Converging and Regulatory Barriers Falling, Service Carriers Are Ready to Rumble," Data Communications, Sep. 21, 1995, vol. 24, No. 13, pp. 75-76, 78, 80, XP000526196.
Roizen, Joseph "Teletext in the USA," Society of Motion Picture and Television Engineers Journal, Jul. 1981, pp. 602-610.
Roseville City Council Presentation, Mar. 13, 1985 (Defendant's Exhibit 226).
Ross Peddicord, "New on TV: You Bet Your Horse," *The Sun*, Baltimore Maryland Dec. 15, 1994, 1 pg.
Schlender, B.R., "Couch Potatoes! Now It's Smart TV," Fortune, Nov. 20, 1989, pp. 111-116.
Schmuckler, Eric "A marriage that's made in cyberspace (television networks pursue links with online inforamtion services)," May 16, 1994 Mediaweek, v. 4, No. 20, p. 22(3).
Sealfon, Peggy, "High Tech TV," Photographic, Dec. 1984.
"StarSight Interactive Television Program Guide III" Jim Leftwich and Steve Schein, Functional-Interactional Architecture Specification Document, Orbit Interaction, Palo alto, California, Published before Apr. 19, 1995.
"StarSight Interactive Television Program Guide IV" Jim Leftwich and Steve Schein, Functional-Interactional Architecture Specification Document, Orbit Interaction, Palo Alto, California, Published before Apr. 19, 1995.
Sunada, K. et al, "Teletext Color Television Receiver Model C-29M950, C26M940," NEC Home Electronics , NEC Giho, 1987.
Sussman, A. "GTE Tunes in to Home TV Shopping," *PC Week*, Jun. 28, 1988, p. C15.
Tech Notes: Product Updates from M-A-COM Cable Home Group, "Videocipher Owner's Manual Update," Issue No. 6, Feb. 1986.
Technical White Paper, "Open TV™ Operating Environment," (© 1998 OpenTV Inc.), pp. 1-12.
Technological Examination & Basic Investigative Research Report on Image Databases, Japan Mechanical Engineering Organization Int'l Society for the Advancement of Image Software, Japan, Mar. 1988.
Technology: Turn on, tune in and print out—An experimental interactive television service is set to alter our viewing habits, *Financial Times* (London), Oct. 14, 1993, p. 11.
The New Media and Broadcast Policy: An Investigation & Research Conference Report on Broadcasting Diversifiation, Radio Regulatory Bureau, Japan Ministry of Posts & Telecommunications, Mar. 1982.
Transcript of the Deposition of John Roop, Oct. 1996, pp. 186-187.
Trial testimony of Michael Axford, *Prevue Interactive, Inc. and United Video Satellite Group, Inc.* v. *Starsight Telecast, Inc.*, May 9, 1998, pp. 186-187, 295-315, and 352-357.
"TV Guide Online Set for Fall", Entertainment Marketing Letter, Aug. 1994.
"TV Listings Functional Spec.," Time Video Information Services, Inc., undated.
"Using StarSight 2," Instruction Manual, StarSight Telecast, Inc., Starsight CB 1500 Customer Letter, 1994.
UV-133 Cont. 6 Declaration Under 37 C.F.R. § 1.132 of Richard E. Glassberg, signed Oct. 20, 2006, filed Oct. 24, 2006.
Various publications of Insight Telecast, 1992 and 1993.
Veith, R.H., "Television's Teletext," Elsivier Science Publishing Co., Inc, 1983, pp. 13-20, 41-51.
Videocipher Stipulation, May 1996.
VideoGuide, "VideoGuide User's Manual," pp. 1-28 (p. 11 is the most relevant), undated.
W. Leo Hoarty, "Multimedia on Cable Television Systems," Symposium Record Table TV Sessions, 18th International Television Symposium and Technical Exhibition, Montreux, Switzerland, Jun. 10, 1993, pp. 555-567.
Windows 98 Feature Combines TV, Terminal and the Internet, *New York Times*, Aug. 18, 1998.

(56) References Cited

OTHER PUBLICATIONS

Wittig et al.,"Intelligent Media Agents in Interactive Television Systems," Proceedings of the Interna-tional Conference on Multimedia Computing and Systems, Los Alamitos, CA, US, May 15-18, 1995, pp. 182-189, XP 000603484.

Yee Hsiang Chang et al., "An Open-Systems Approach to Video on Demand," *IEEE Communications Magazine*, May 1994, pp. 68-80.

Office Actions and Corresponding Replies in relation to U.S. Patent No. 6,177,931.

Office Actions and Corresponding Replies in relation to U.S. Patent No. 6,756,997.

Office Actions and Corresponding Replies in relation to U.S. Patent No. 09-034,939.

Office Actions and Corresponding Replies in relation to U.S. Appl. No. 10/346,255.

Office Actions and Corresponding Replies in relation to U.S. Appl. No. 10/346,266.

Office Actions and Corresponding Replies in relation to U.S. Patent No. 6,396,546.

"European Telecommunications Standards: Digital Broadcasting Systems for Television Sound and Data Services; Specification for Service Information (SI) in Digital Video Broadcasting (DVB) Systems," European Telecommunications Standards Institute, Dec. 1994.

"Getting Started" Installation Guide, "Using Starsight 1" Manual, and Remote Control "Quick Reference Guide,".

"StarSight Interactive Television Program Guide" Jim Leftwich, Willy Lai & Steve Schein, Published before Apr. 19, 1995.

Bach, U. et al., "Multimedia TV Set, Part 1" Radio-Fernsehen Elektronik (RFE), Sep. 1996, pp. 28, 30, 31. (English language translation attached.).

Bach, U. et al., "Multimedia TV Set, Part 2 and Conclusion," Radio-Fernsehen Elektronik (RFE), Oct. 1996, pp. 38-40. (English language translation attached.).

CableData, Roseville Consumer Presentation, Mar. 1985.

Dinwiddle et al., "Combined-User Interface for Computers, Televison, Video Recorders, and Telephone, etc." IBM Technical Disclosure Bulletin, vol. 33(3B), pp. 116-118 (1990).

Instruction Manual "Using StarSight 2" Published before Apr. 19, 1995.

IPG Attitude and Usage Study, prepared by Lieberman Research Worldwide for Gemstar-TV Guide International, Oct. 2002.

Kai et al "Development of a Simulation System for Integrated Services Television," Report from Information Processing Society of Japan, Japan, Sep. 13, 1996, vol. 96, No. 90 pgs.

Letter from StarSight Telecast, Inc. to a StarSight IPG subscriber (with subscriber name, address and account number redacted) notifying the subscriber of termination of the StarSight IPG, 2003.

Miller, Matthew D., "A Scenario for the Deployment of Interactive Multimedia Cable Television Systems in the United States in the 1990's", Proceedings of the IEEE, vol. 82, pp. 585-589, Apr. 1994.

Oberlies, et al.; "VPS-Anzeige Und Uberwachungsgerat", Rundfunktechnische Mitteilungen, vol. 30, No. 1 Jan. 1986-Feb. 1986, Norderstedt (DE).

Prevue Guide Brochure, Spring 1984.

Prevue Networks, Inc. Promotional Materials, 1994.

RCA Satellite Receiver User's Manual, 2001.

Winkler, M., "Computer Cinema: Computer and video: from TV converter to TV studio," Computerkino, (translation) Exhibit NK 13 of TechniSat's nullity action against EP'111, Issue 10, pp. 100-107 (1992).

\* cited by examiner

PROMOTIONAL PHILOSOPHY FOR A VIDEO-ON-DEMAND-RELATED INTERACTIVE DISPLAY WITHIN AN INTERACTIVE TELEVISION APPLICATION

This is a continuation of U.S. patent application Ser. No. 10/898,002, filed Jul. 22, 2004, which is a continuation of U.S. patent application Ser. No. 09/607,208, filed Jun. 28, 2000, now abandoned, which claims the benefit of U.S. provisional patent application No. 60/141,575 filed Jun. 29, 1999. All of these prior applications are hereby incorporated by reference herein in their entireties.

BACKGROUND OF THE INVENTION

This invention relates to television application systems, and more particularly, to interactive television application systems such as interactive television program guide systems that provide indicators of video-on-demand offerings.

Interactive television program guides are typically implemented on set-top boxes connected to televisions. Such program guides may be used to present screens of interactive television program listings to users. Video-on-demand systems allow users to order videos for immediate delivery to the home over a cable or other suitable path.

It is an object of the present invention to provide an interactive display indicators for video-on-demand offerings using a promotional selection algorithm such as a promotional philosophy.

SUMMARY OF THE INVENTION

This and other objects of the present invention are accomplished in accordance with the principles of the present invention by providing an interactive display of indicators, such as promotions or listings, for video-on-demand offerings to a user based on a promotional selection algorithm as described, for example, in McCoy et al. provisional patent application Ser. No. 60/141,575, filed Jun. 29, 1999, which is hereby incorporated by reference herein in its entirety. The promotional selection algorithm according to which promotions or listings are displayed may be based on, for example, a promotional philosophy. If desired, the indicators may be presented in a passive display within an otherwise interactive application.

Generally, promotional philosophies are promotional event selection algorithms. A particular promotional philosophy may be designed to attempt to maximize returns from content such as promotions or advertisements by positioning certain types of promotions and advertisements at particular times of the day to reach certain types of television viewers. Promotional material distribution systems in which promotional philosophies are used to distribute promotions are described, for example, in Kern et al. U.S. patent application Ser. No. 09/332,448, filed Jun. 11, 1999, which is hereby incorporated by reference herein in its entirety. Systems in which users are "targeted" for specific advertisements are described, for example, in Reynolds et al. U.S. patent application Ser. No. 09/217,100, filed Dec. 16, 1998, which is hereby incorporated by reference herein in its entirety.

An interactive application presents an interactive display containing indicators of video-on-demand offerings (e.g., on demand movies, television programs, video clips, or any other suitable type of programming). The interactive application may be any suitable application, such as interactive television program guide, web browser, or other application. The offerings are displayed according to a particular promotional selection algorithm designed to have indicators presented so as to attempt to maximize, for example, the return on or the viewer rate of video-on-demand programs. Promotional selection algorithms may also be designed to have indicators selected so that any other suitable paradigm for the display of indicators is met. For example, it may be undesirable to have certain programs indicated at a certain time of day (e.g., adult programs), or it may be desirable to have some programs indicated more often based on upcoming holidays or events.

The display may include, for example, a series of buttons or other selectable on-screen display elements that contain listings for video-on-demand programs. The interactive display may include, for example, a browse display that provides a user with an opportunity to browse video-on-demand program listings while watching a television program. The interactive display may include, for example, a screening room within which users may view trailers or clips of video-on-demand offerings. Systems in which video-on-demand listings are displayed in a browse display are described, for example, in Ellis U.S. patent application Ser. No. 09/262,870, filed Mar. 4, 1999, which is hereby incorporated by reference herein in its entirety. Any other suitable approach for the display indicators of video-on-demand offerings.

The interactive application may obtain application data and data that define the promotional selection algorithm using any suitable approach. The application may, for example, obtain data continuously, periodically, on-demand or using any other suitable approach. The interactive application may also receive templates that define a desired promotional selection algorithm such as a promotional philosophy.

The promotional philosophy may be designed to include promotions or programs in the interactive application based on and suitable criteria. The promotional philosophy may be based on, for example, the availability of a video-on-demand offering or the availability a promotion for such an offering (e.g., when sent by satellite via Moving Picture Experts Group (MPEG), or a videodisc in a player). The promotional philosophy may be defined to cause the selection of promotions or programs based on, for example, conditional play attributes. For example, a listing or promotion (or group of listings or promotions) may be designated for inclusion in the interactive display only on Fridays if the weather is cold outside and the local system has HBO in its channel line up. The display characteristics of a promotion or program listing may also be determined according to the promotional philosophy. For example, a promotion or program listing may be displayed first in an interactive display before other types of program listings or promotions for programs (e.g., sitcoms). If desired, the application may monitor user actions to determine if a given promotional philosophy results in desirable video-on-demand program selection.

The indicators of video-on-demand offerings and corresponding promotional philosophies may be based on, for example, what data the interactive application requests, detectable environmental situations, or what is provided by the video-on-demand system. Some examples of environmentally detectable situations include: the specific clip played in relation to a title selected by a user, the channel line up provided to the user, the weather, local channels, promotional media available, and specific customer behaviors or profiles (e.g., whether the user subscribes to adult or children's programming). In these examples, the promotional philosophies may be designed using alternates, playability levels, and keywords as described, for example in above-mentioned Kern et al. U.S. patent application Ser. No. 09/332,448, filed Jun. 11, 1999.

User selections of indicators or other user activity may be analyzed to determine whether the promotional philosophy of the interactive display facilitates a desirable result (e.g., purchases of particular video-on-demand programming), or whether the promotional philosophy needs to be modified. Interactive program guide systems in which user usage of advertisements is monitored are described, for example, in Thomas et al. U.S. patent application Ser. No. 09/139,798, filed Aug. 25, 1998, which is hereby incorporate by reference herein in its entirety. The interactive display may be updated to display only the promotions or programs that a user is most interested in viewing, or that the video-on-demand system or interactive application provider desires to present to the user (which may be based on, for example, particular environmental situations and user demographics).

The interactive display may be based on templates that are modified for each user based on, for example, the individual user's profile, the hardware on which the interactive display is displayed (e.g., the configuration of the user's set-top box), or other user specific information. Thus, the interactive display may look different for each user, but is derived from the same basic template that has been provided according to the chosen selection algorithm, such as a promotional philosophy algorithm. The user's profile may include, for example information suitable to select indicators in a way that personalizes the interactive display to the user in accordance with the selection algorithm. For example, a playability level may include user preferences. User preferences may be generated or obtained using any suitable scheme for monitoring user behavior and targeting the user with indicators for appropriate content. In another suitable approach, the user may define a preference profile that is used for indicator selection.

In another suitable approach, the system may maintain a record that includes environmentally detectable situations and specifics of resulting interactive display. This may be combined with the actual behavior of the user to form a log that is available to a master processing system. The record may be maintained on a disc drive in the system and may be available to the master processing system via suitable transmission media. The system may analyze this record and may correct the promotional philosophy. The system may, for example, modify the promotional philosophy based on desirable or undesirable results from a recorded log. Systems in which promotional philosophy algorithms are automatically updated are described, for example, in Lumley et al. U.S. patent application Ser. No. 09/227,401, filed Jan. 8, 1999, which is hereby incorporated by reference herein in its entirety.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
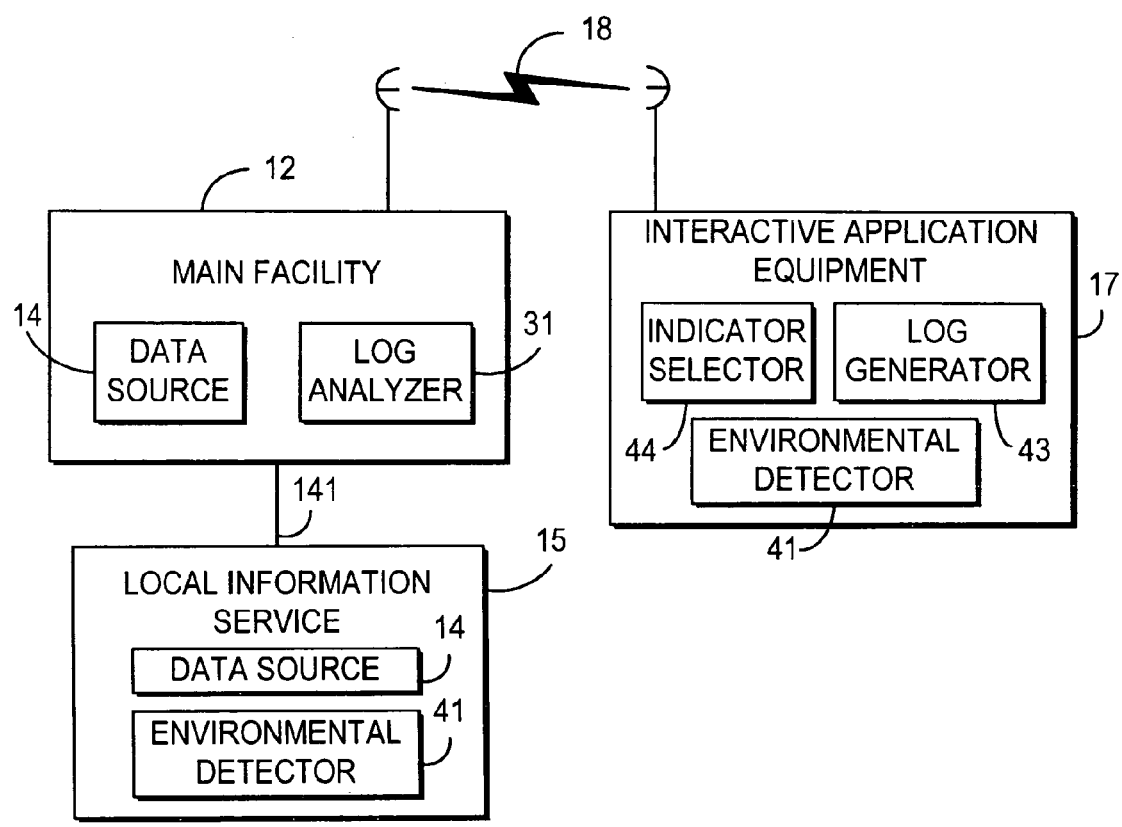
FIG. 1 is a schematic block diagram of a system in accordance with the present invention.

An illustrative system 10 in accordance with the principles of the present invention is shown in FIG. 1. Main facility 12 may provide application data, such as program guide data, from data source 14 to interactive application equipment 17 via communications link 18. There may be multiple data sources but only one has been shown to avoid over complicating the drawing. If desired, data sources may be located at facilities separate from main facility 12, such as at local information services 15, and may have their data provided to main facility 12 for localization and distribution. Data sources 14 may be any suitable computer or computer based system for obtaining data (e.g., manually from an operator, electronically via a computer network or other connection, or via storage media) and providing the data in electronic form for distribution by main facility 12. Data sources 14 may also receive promotional material for distribution to interactive application equipment 17. Link 18 may be a satellite link, a telephone network link, a cable or fiber optic link, a microwave link, an Internet link, a combination of such links, or any other suitable communications link. Video signals may also be transmitted over link 18 if desired.

Local information service 15 may be any facility suitable for obtaining data particular to a localized region and providing the data to main facility 12 over communications link 141. Local information service 15 may be, for example, a local weather station that measures weather data, a local newspaper that obtains local high school and college sporting information, or any other suitable provider of information. Local information service 15 may be a local business with a computer for providing main facility 12 with, for example, local ski reports, fishing conditions, menus, etc., or any other suitable provider of information. Link 141 may be a satellite link, a telephone network link; a cable or fiber optic link, a microwave link, an Internet link, a combination of such links, or any other suitable communications link.

Local information service 15 may include environmental detector 41. Environmental detector 41 may be equipment suitable for detecting local environmental conditions and providing them to main facility 12 for inclusion in the application data. For example, the local temperature may be supplied by local information service 15 as part of local weather data. Environmental detector 41 may, for example, have a digital thermometer connected to the input-output port of a suitable computer and provide detectable environmental situation information (e.g., temperature data) to a communications device for transmission to main facility 12. Environmental detector 41 may be any other device suitable for detecting environmental situations, such as a barometer, windspeed measuring device, or other suitable device, that is capable of supplying detectable environmental information to main facility 12.

The application data transmitted by main facility 12 to interactive application equipment 17 may include any data suitable for the chosen interactive application. For an interactive program guide, for example, the application data may include television programming data (e.g., program identifiers, times, channels, titles, and descriptions) and other data for services other than television program listings (e.g., help text, pay-per-view information, weather information, sports information, music channel information, associated Internet web links, associated software, etc.). There are preferably numerous pieces or installations of interactive application equipment 17, although only one is shown in FIG. 1 to avoid over-complicating the drawing. The application data may also include data defining the rules of the promotional selection algorithm, such as, for example, promotional philosophy templates. Promotional philosophy templates are described, for example, in above-mentioned Kern et al. U.S. patent application Ser. No. 09/332,448, filed Jun. 11, 1999. If desired, promotional material for video-on-demand offerings may also be provided by main facility 12 using, for example, a store-and-forward approach as described in the same application. The promotional material may include any suitable text, graphics, animation, video, audio, or other multimedia.

Application data may be transmitted by main facility 12 to interactive application equipment 17 using any suitable approach. Data files may, for example, be encapsulated as objects and transmitted using a suitable Internet based addressing scheme and protocol stack (e.g., a stack which uses the user datagram protocol (UDP) and Internet protocol (IP)). Systems in which program guide data is transmitted from a main facility to television distribution facilities as objects are described, for example, in Gollahon et al. U.S. patent application Ser. No. 09/332,624, filed Jun. 11, 1999, which is hereby incorporated by reference herein in its entirety.

Main facility 12 may include log analyzer 31. Log analyzer 31 may include any suitable storage, processing, and communications circuitry or devices for monitoring the indicator selection process or other processes carried out by interactive application equipment 17. Interactive application equipment 17 may provide a selection log to main facility 12. The selection log may list the actual indications (e.g., promotions, listings, etc.) that are included by the interactive application within the interactive display. Logging the indicators that are actually displayed may be useful when, for example, indicators are selected for display but are unavailable during screen generation. This may occur when, for example, indicators are received corrupted such as when link 18 is very noisy. In another suitable approach, the selection log may log what is selected, or a combination of these approaches may be used. Log analyzer 31 may also monitor changes to the selection log over communications link 18 or another communications link to observe the selecting of indicators at about the same time they are selected. The selection log may be used by log analyzer 31 to modify the promotional philosophy used by interactive application equipment 17 in order to maximize the probability of achieving the desired results for the system, or to test how changes to a promotional philosophy might affect indicator selection.

Interactive application equipment 17 may include indicator selector 44, log system 43, and environmental detector 41. Indicator selector 44 may be any combination of hardware and software suitable for generating a playlist, set, database, or other data structure that either indicates or includes indicators of video-on-demand selections for presentation in the interactive display according to the chosen selection algorithm. The indicator list may be, for example, a playlist of video-on-demand promotions chosen according to a promotional philosophy as described, for example, in above-mentioned Kern et al. U.S. patent application Ser. No. 09/332,448, filed Jun. 11, 1999. The indicator list may be, for example, a set, database or other data structure of program listings for video-on-demand program listings that are incorporated into the interactive display. In still another suitable approach, the indicator list may be generated in real time; that is, indicator selector 44 may select indicators for presentation and immediately display them without first creating a list. Indicator selector 44 may be, for example, a process running on a computer acting as an application server, a process running on a set-top box, or any other suitable combination of hardware and software.

Log generator 43 may be any combination of hardware and software suitable for generating a list or other data structure of the indicators that are actually presented by the interactive application in the interactive display. Log generator may be for example, a process running on a computer acting as an application server, a process running on a set-top box, or any other suitable combination of hardware and software.

Indicator selector 44 may use data regarding local environmental conditions when determining if a particular indicator meets a particular selection algorithm. For example, whether a particular video-on-demand offering is promoted or included in a list of listings may depend on the local temperature. The local temperature may be supplied by main facility 12 as part of local weather data contained in the data stream, or may be supplied by a local operator or device responsible for supplying local environmental information, such as environmental detector 41. Environmental detector 41 may, for example, have a digital thermometer connected to the input-output port of a suitable computer and provide detectable environmental situation information (e.g., temperature data) to indicator selector 44. Environmental detector 41 may be any other device suitable for detecting environmental situations, such as a barometer, windspeed measuring device, or other suitable device, that is capable of supplying detectable environmental situation information to indicator selector 44 for use in detecting if an environmentally detectable situation parameter has been met.

Indicator selector 44 may use user preference profiles to personalize the interactive display to a particular used. The profiles may be modified for each user based on, for example, the individual user's profile, the hardware on which the interactive display is displayed (e.g., the configuration of the user's set-top box), or other user specific information. Thus, the interactive display may look different for each user, but is derived from the same basic template that has been provided according to the chosen selection algorithm, such as a promotional philosophy algorithm. The user's profile may include, for example information suitable to select indicators in a way that personalizes the interactive display to the user in accordance with the selection algorithm. For example, a playability level may include user preferences. User preferences may be generated or obtained using any suitable scheme for monitoring user behavior and targeting the user with indicators for appropriate content. In another suitable approach, the user may define a preference profile that is used for indicator selection.

An interactive application is implemented on interactive application equipment 17. The interactive application may be any application suitable for providing users with the interactive display. The application may be, for example, an interactive television program guide, search engine, or any other suitable application. For purposes of clarity and not by way of limitation, the following discussion will describe the invention implemented as an illustrative interactive television program guide implemented on interactive application equipment 17. Five illustrative arrangements for interactive application equipment 17 are shown in FIGS. 2*a*-2*e*. As shown, interactive application equipment 17 may include one or more of distribution equipment 21, located at distribution facility 16, and user television equipment 22 or personal computer 23.

To avoid over-complicating FIGS. 2a-2e, indicator selector 44, environmental detector 41, and log generator 43 have been shown generally in FIG. 1 and are not shown in FIGS. 2a-2e. Indicator selector 44, environmental detector 41, and log generator 43 may be included in distribution facility 16 if desired as one or more separate systems, or one or more of their functionalities may be incorporated into any suitable component shown in FIGS. 2a-2e. For example, the functionalities of one or more of indicator list generator 44, environmental detector 41, or log generator 43 may reside in or be integrated with distribution equipment 21, application guide server 25, Internet service system 61, application server 25, or user television equipment 22. When incorporated into user television equipment 22, user television equipment 22 may be configured to communicate information, such as environmental conditions or indicator logs, back to distribution facility 16 or main facility 12.

Figure 2A:
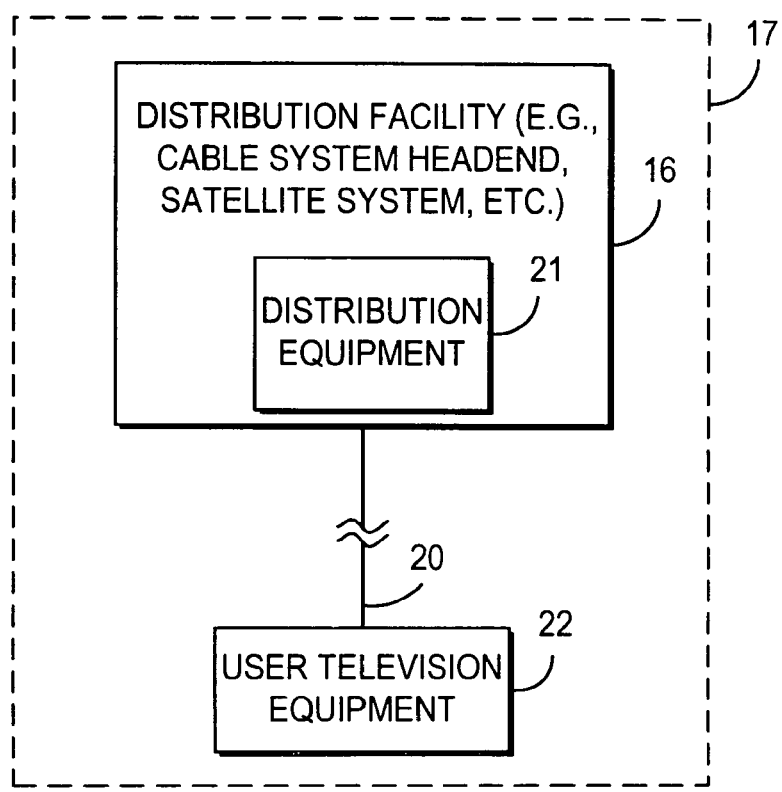
FIGS. 2a-2e are schematic block diagrams of illustrative arrangements for the interactive application equipment of FIG. 1 in accordance with the present invention.
Figure 2B:
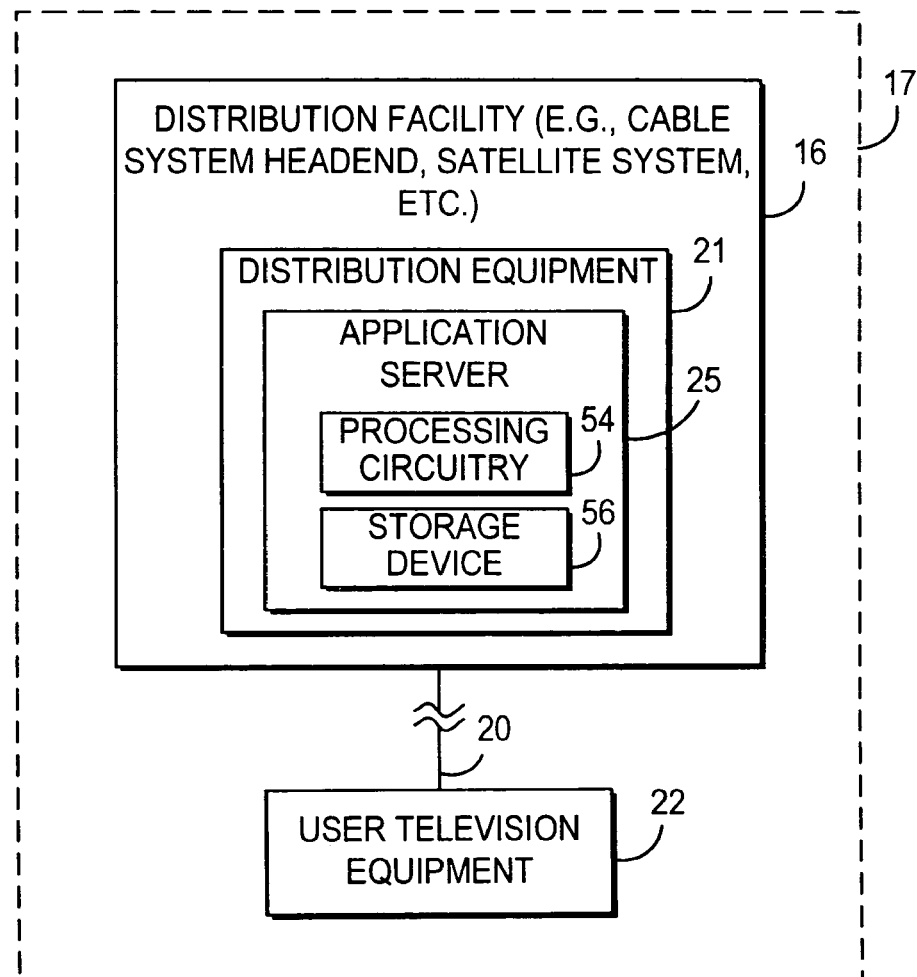
Figure 2C:
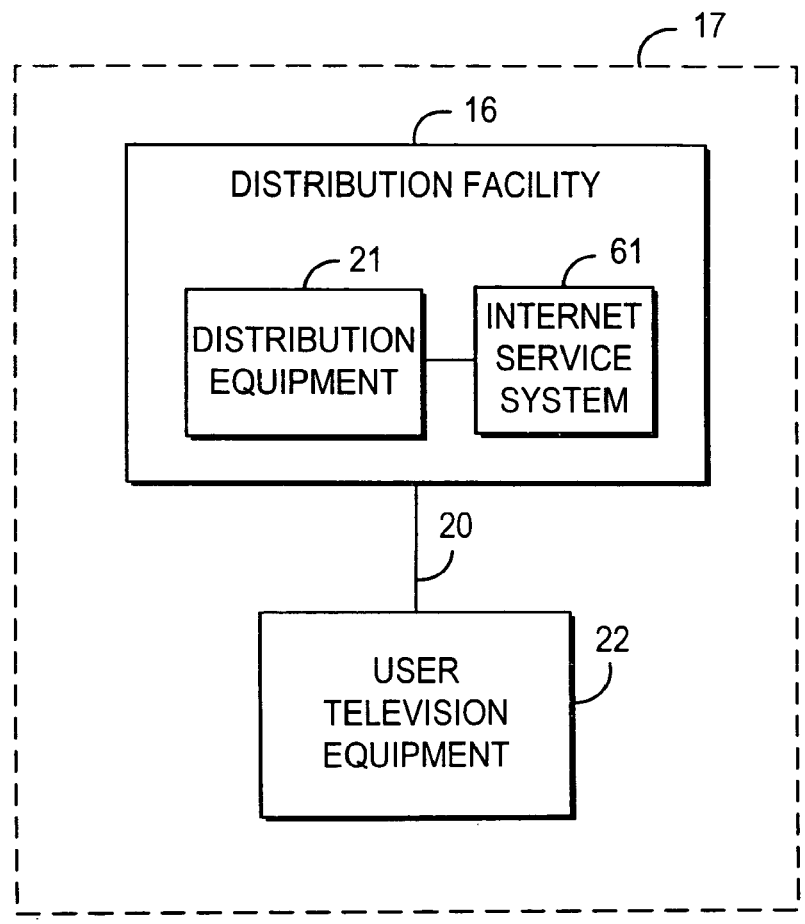
Figure 2D:
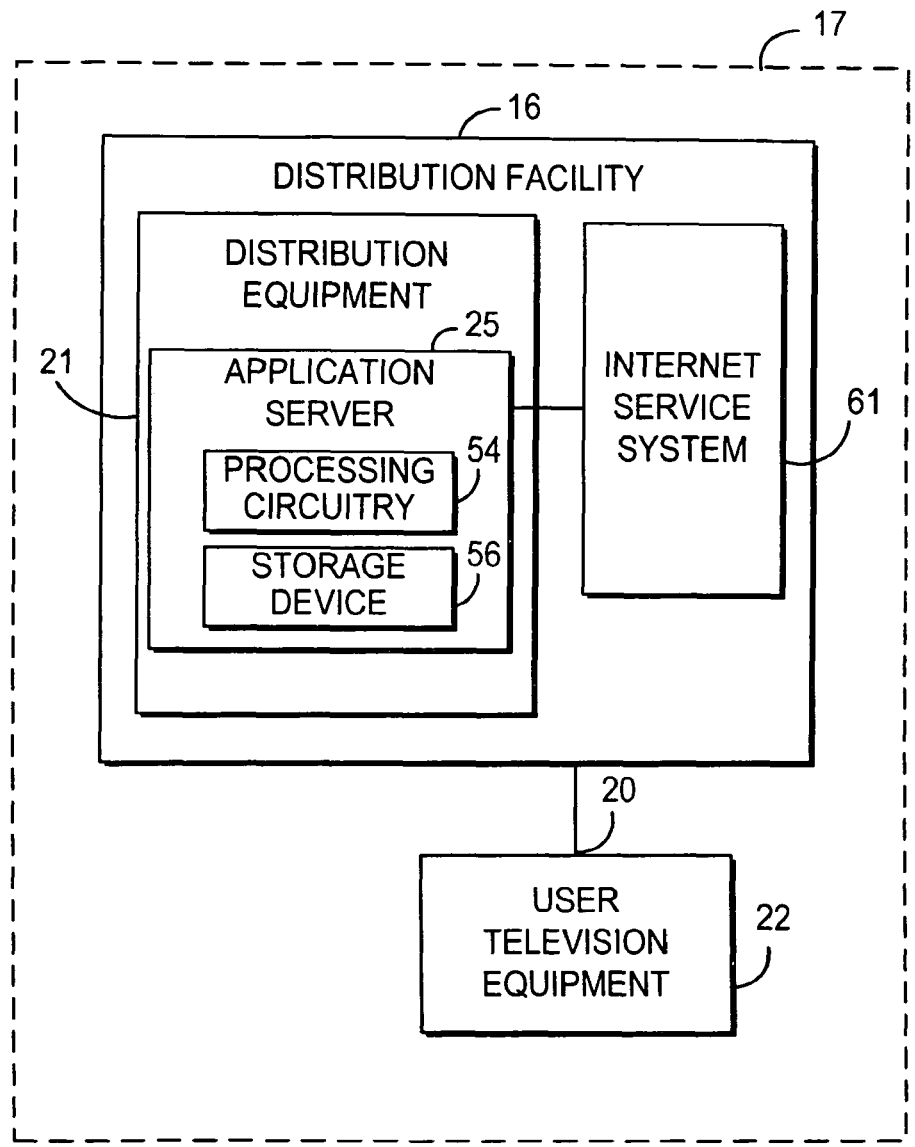

The interactive television program guide (or other interactive application) may run totally on user television equipment 22 as shown in FIGS. 2a and 2c, or may run partially on user television equipment 22 and partially on interactive application equipment 17 using a suitable client-server or distributed processing approach as shown in FIGS. 2b and 2d. Distribution facility 16 may be any suitable distribution facility (e.g., a cable system headend, a broadcast distribution facility, a satellite television distribution facility, an Internet site, or any other suitable type of television distribution facility). Distribution facility 16 may have distribution equipment 21.

Distribution equipment 21 of FIGS. 2a, 2b, 2c, and 2d may be any equipment suitable for providing application data to user television equipment 22 over communications path 20. Distribution equipment 21 may include, for example, suitable transmission hardware for distributing application data on a television channel sideband, in the vertical blanking interval of a television channel, using an in-band digital signal (e.g., MPEG tables), using an out-of-band digital signal, using Internet streaming techniques or by any other suitable data transmission technique. Analog or digital video signals (e.g., television programs, pay-per-view programs, video-on-demand programs, etc.) may also be distributed by distribution equipment 21 to user television equipment 22 over communications paths 20 on multiple television channels.

Communications paths 20 may be any communications paths suitable for distributing application data and, if desired, video signals. Communications paths 20 may include, for example, a satellite link, a telephone network link, a cable or fiber optic link, a microwave link, an Internet link, a data-over-cable service interface specification (DOCSIS) link, a digital subscriber line (DSC) link, a combination of such links, or any other suitable communications link. Communications paths 20 preferably have sufficient bandwidth to allow distribution facility 16 to distribute television programming to user television equipment 22. There are typically multiple pieces of user television equipment 22 and multiple associated communications paths 20, although only one piece of user television equipment 22 and communications path 20 are shown in FIGS. 2a-2d to avoid over complicating the drawings. If desired, television programming may be provided over separate communications paths (not shown).

FIG. 2b shows an illustrative arrangement for interactive application equipment 17 in a client-server based or distributed interactive program guide system. As shown in FIG. 2b, distribution equipment 21 may include application server 25.

Application server 25 may be any suitable software, hardware, or combination thereof for providing a client-server based application such as a program guide. Application server 25 may, for example, run a suitable database engine (e.g., SQL Server by Microsoft) and provide program guide data in response to queries generated by a program guide client implemented on user television equipment 22. If desired, application server 25 may be located at main facility 12 (not shown).

Application server 25 may be based on any suitable combination of server software and hardware. Application server 25 may retrieve application data such as program guide data, promotion files, or any suitable combination thereof from storage device 56 in response to requests for program guide or promotional material generated by an interactive application client implemented on user television equipment 22. As shown in FIGS. 2a and 2b, application server 25 may include processing circuitry 54 and storage device 56. Processing circuitry 54 may include any suitable processor, such as a microprocessor or group of microprocessors, and other processing circuitry such as caching circuitry, video decoding circuitry, direct memory access (DMA) circuitry, input/output (I/O) circuitry, etc.

Storage device 56 may be a memory or other storage device, such as random access memory (RAM), flash memory, a hard disk drive, etc., that is suitable for storing application data and, if desired, promotional material. User data, such as user preference profiles (whether generated by the system or defined by the user), parental control settings, record and reminder settings, viewing histories, the configuration of the user's equipment and other suitable data may also be stored on storage device 56 by application server 25. Program guide data and user data may be stored on storage device 56 in any suitable format (e.g., a Structured Query Language (SQL) database). User data may be used by indicator list generator 44 to select indicators for the interactive display. If desired, storage device 56 may also store video-on-demand programs for playing back on demand.

Processing circuitry 54 may process requests for application data by searching the application data stored on storage device 56 for the requested data, retrieving the data, and providing the retrieved data to distribution equipment 21 for distribution to user television equipment 22. Processing circuitry 54 may also process storage requests generated by the application client that direct application server 25 to store user data. Alternatively, application server 25 may distribute application data to and receive user data from user television equipment 22 directly. If communications paths 20 include an Internet link, DOCSIS link, or other high speed computer network link (e.g., 10BaseT, 100BaseT, 10BaseF, T1, T3, etc.), for example, processing circuitry 54 may include circuitry suitable for transmitting application and user data and receiving application data and storage requests over such a link.

Application server 25 may communicate with user television equipment 22 using any suitable communications protocol. For example, application server 25 may use a communications protocol stack that includes transmission control protocol (TCP) and Internet protocol (IP) layers, sequenced packet exchange (SPX) and internetwork packet exchange (IPX) layers, Appletalk transaction protocol (ATP) and datagram delivery protocol (DDP) layers, DOCSIS, or any other suitable protocol or combination of protocols. User television equipment 22 may also include suitable hardware for communicating with application server 25 over communications paths 20 (e.g., Ethernet cards, modems (digital, analog, or cable), etc.)

The program guide client on user television equipment 22 may retrieve program guide data from and store user data on application server 25 using any suitable client-server based approach. The program guide may, for example, pass SQL requests as messages to application server 25. In another suitable approach, the program guide may invoke remote procedures that reside on application server 25 using one or more remote procedure calls. Application server 25 may execute SQL statements for such invoked remote procedures. In still another suitable approach, client objects executed by the program guide may communicate with server objects executed by application server 25 using, for example, an object request broker (ORB). This may involve using, for example, Microsoft's Distributed Component Object Model (DCOM) approach. As used herein, "record requests" and "storage requests" are intended to encompass any of these types of inter-process or inter-object communications, or any other suitable type of inter-process or inter-object communication.

FIGS. 2c and 2d show illustrative Internet-based systems. Distribution facility 16 may, for example, include Internet service system 61. Internet service system 61 may use any suitable combination of hardware and software capable of providing program guide data to the guide using an Internet based approach (e.g., the HyperText Transfer Protocol (HTTP)).

If the program guide is implemented on user television equipment 22 of interactive application equipment 17 as shown in FIG. 2c, Internet service system 61 (or other suitable equipment at distribution facility 16 that is connected to Internet service system 61) may provide program guide data to user television equipment 22 via the Internet, or via application distribution equipment 21 using any suitable Internet-based approach (e.g., using the HyperText Transfer Protocol (HTTP) or File Transfer Protocol (FTP) over a Transmission Control Protocol/Internet Protocol (TCP/IP) type link). If the program guide implemented on interactive application equipment 17 is a client-server guide as shown in FIG. 2d, for example, application server 25 may obtain program guide data from Internet service system 61. In another suitable approach, the program guide may obtain program guide data from Internet service system 61 via an Internet connection.

In still another embodiment, distribution equipment 21 may include suitable hardware (not shown) on which a first portion or version of the interactive television program guide is implemented. A second portion or version of the program guide may be implemented on user television equipment 22. The two versions or portions of the interactive program guide may communicate using any suitable peer-to-peer communications scheme (e.g., messaging, remote procedure calls, etc.) and perform interactive program guide functions distributively between television distribution facility 16 and user television equipment 22.

Figure 2E:
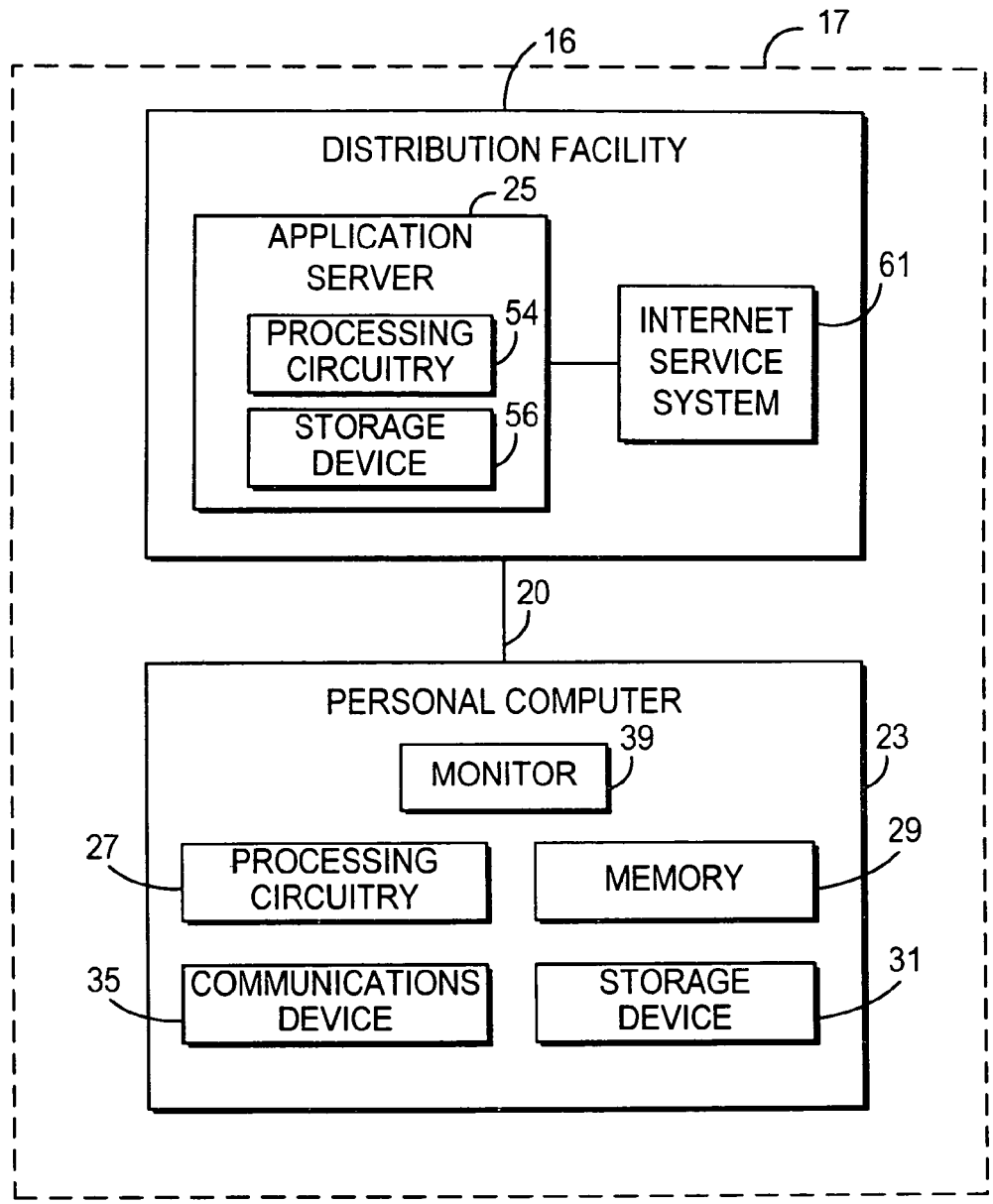

Another suitable arrangement for interactive application equipment 17 is shown in FIG. 2e. Interactive application equipment 17 may include, for example, distribution facility 16 having application server 25 and Internet service system 61. A program guide client application (or other client application) may run on personal computer 23. The client may access application server 25 via Internet service system 61 and communications path 20. Personal computer 23 may include processing circuitry 27, memory 29, storage device 31, communications device 35, and monitor 39.

Processing circuitry 27 may include any suitable processor, such as a microprocessor or group of microprocessors, and other processing circuitry such as caching circuitry, direct memory access (DMA) circuitry, input/output (I/O) circuitry, etc. Processing circuitry 27 may also include suitable circuitry for displaying television programming. Personal computer 23 may include, for example, a PC/TV card. Memory 29 may be any suitable memory, such as random access memory (RAM) or read only memory (ROM), that is suitable for storing the computer instructions and data. Storage device 31 may be any suitable storage device, such as a hard disk, floppy disk drive, flash RAM card, recordable CD-ROM drive, or any other suitable storage device. Communications device 35 may be any suitable communications device, such as a conventional analog modem or cable modem.

Figure 3:
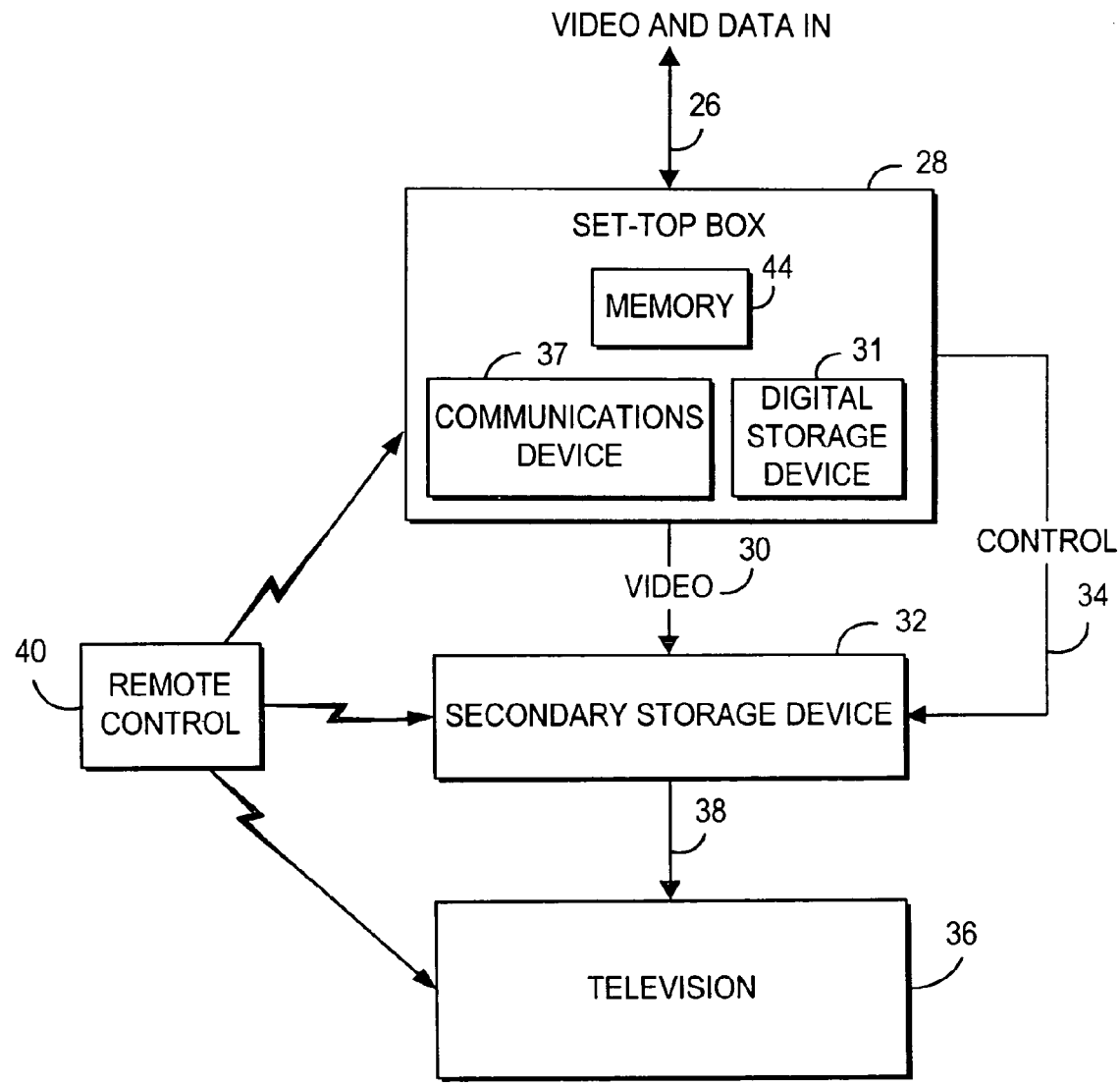
FIG. 3 is a schematic block diagram of the user television equipment of FIGS. 2a-2d in accordance with the present invention.

An illustrative arrangement for user television equipment 22 of FIGS. 2a-2d is shown in FIG. 3. User television equipment 22 of FIG. 3 receives video or a digital video stream and data from distribution facility 16 (FIG. 1) at input 26. During normal television viewing, a user tunes set-top box 28 to a desired television channel. The signal for that television channel is then provided at video output 30. The signal supplied at output 30 is typically either a radio-frequency (RF) signal on a predefined channel (e.g., channel 3 or 4), or a analog demodulated video signal, but may also be a digital signal provided to television 36 on an appropriate digital bus (e.g., a bus using the Institute of Electrical and Electronics Engineers (IEEE) 1394 standard, (not shown)). The video signal at output 30 is received by optional secondary storage device 32.

The interactive television program guide (or other application) may run on set-top box 28, on television 36 (if television 36 has suitable processing circuitry and memory), on a suitable analog or digital receiver connected to television 36, or on digital storage device 31 if digital storage device 31 has suitable processing circuitry and memory. The interactive television program guide may also run cooperatively on a suitable combination of these devices. Interactive television program guide systems in which a cooperative interactive television program guide runs on multiple devices are described, for example, in Ellis U.S. patent application Ser. No. 09/186,598, filed Nov. 5, 1998, which is hereby incorporated by reference herein in its entirety.

Secondary storage device 32 can be any suitable type of analog or digital program storage device or player (e.g., a videocassette recorder, a digital versatile disc (DVD) player, etc.). Program recording and other features may be controlled by set-top box 28 using control path 34. If secondary storage device 32 is a videocassette recorder, for example, a typical control path 34 involves the use of an infrared transmitter coupled to the infrared receiver in the videocassette recorder that normally accepts commands from a remote control such as remote control 40. Remote control 40 may be used to control set-top box 28, secondary storage device 32, and television 36.

If desired, a user may record programs, program guide data, or a combination thereof in digital form on optional digital storage device 31. Digital storage device 31 may be a writeable optical storage device (such as a DVD player capable of handling recordable DVD discs), a magnetic storage device (such as a disk drive or digital tape), or any other digital storage device. Interactive television program guide systems that have digital storage devices are described, for example, in Hassell et al. U.S. patent application Ser. No. 09/157,256, filed Sep. 17, 1998, which is hereby incorporated by reference herein in its entirety.

Digital storage device 31 can be contained in set-top box 28 or it can be an external device connected to set-top box 28 via an output port and appropriate interface. If necessary, processing circuitry in set-top box 28 formats the received video, audio and data signals into a digital file format. Preferably, the file format is an open file format such as the Moving Picture Experts Group (MPEG) MPEG-2 standard or the Moving Joint Photographic Experts Group (MJPEG) standard. The resulting data is streamed to digital storage device 31 via an appropriate bus (e.g., a bus using the Institute Electrical and Electronics Engineers (IEEE) 1394 standard), and is stored on digital storage device 31. In another suitable approach, an MPEG-2 data stream or series of files may be received from distribution equipment 21 and stored.

Television 36 receives video signals from secondary storage device 32 via communications path 38. The video signals on communications path 38 may either be generated by secondary storage device 32 when playing back a prerecorded storage medium (e.g., a videocassette or a recordable digital video disc), by digital storage device 31 when playing back a prerecorded digital medium, may be passed through from set-top box 28, may be provided directly to television 36 from set-top box 28 if secondary storage device 32 is not included in user television equipment 22, or may be received directly by television 36. During normal television viewing, the video signals provided to television 36 correspond to the desired channel to which a user has tuned with set-top box 28. Video signals may also be provided to television 36 by set-top box 28 when set-top box 28 used to play back information stored on digital storage device 31.

Set-top box 28 may have memory 44. Memory 44 may be any memory or other storage device, such as a random access memory (RAM), read only memory (ROM), flash memory, a hard disk drive, a combination of such devices, etc., that is suitable for storing program guide instructions and program guide data for use by the program guide.

Set-top box 28 may have communications device 37 for communicating directly with application server 25 or Internet service system 61 over communications path 20. Communications device 37 may be a modem (e.g., any suitable analog or digital standard, cellular, or cable modem), network interface card (e.g., an Ethernet card, Token ring card, etc.), or other suitable communications device. Television 36 may also have such a suitable communications device if desired. In another suitable approach, user television equipment 22 may communicate with Internet service system 61 via distribution equipment 21 using a suitable return path.

Figure 4:
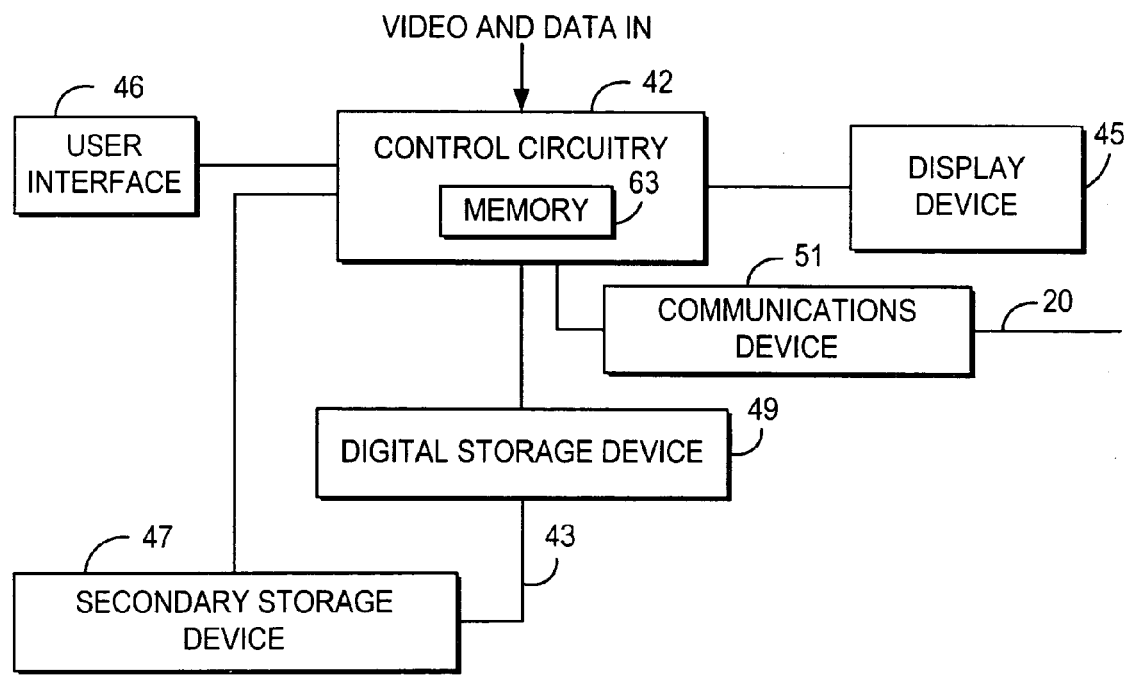
FIG. 4 is a more generalized schematic block diagram of the user television equipment of FIG. 4 in accordance with the present invention.

A more generalized embodiment of user television equipment 22 of FIG. 3 is shown in FIG. 4. As shown in FIG. 4, program guide data from distribution facility 16 (FIG. 1) is received by control circuitry 42 of user television equipment 22. The functions of control circuitry 42 may be provided using the set-top box arrangement of FIGS. 2a and 2b. Alternatively, these functions may be integrated into an advanced television receiver, personal computer television (PC/TV), or any other suitable arrangement. If desired, a combination of such arrangements may be used.

User television equipment 22 may also have secondary storage device 47 and digital storage device 49 for recording programming. Secondary storage device 47 can be any suitable type of analog or digital program storage device (e.g., a videocassette recorder, a digital versatile disc (DVD), etc.). Program recording and other features may be controlled by control circuitry 42. Digital storage device 49 may be, for example, a writeable optical storage device (such as a DVD player capable of handling recordable DVD discs), a magnetic storage device (such as a disk drive or digital tape), or any other digital storage device.

User television equipment 22 may also have memory 63. Memory 63 may be any memory or other storage device, such as a random access memory (RAM), read only memory (ROM), flash memory, a hard disk drive, a combination of such devices, etc., that is suitable for storing program guide instructions and program guide data for use by control circuitry 42.

User television equipment 22 of FIG. 4 may also have communications device 51 for supporting communications between the program guide (or other application) and distribution equipment 21 or Internet service system 61 via communications path 20. Communications device 51 may be a modem (e.g., any suitable analog or digital standard, cellular, or cable modem), network interface card (e.g., an Ethernet card, Token ring card, etc.), or other suitable communications device.

Figure 5:
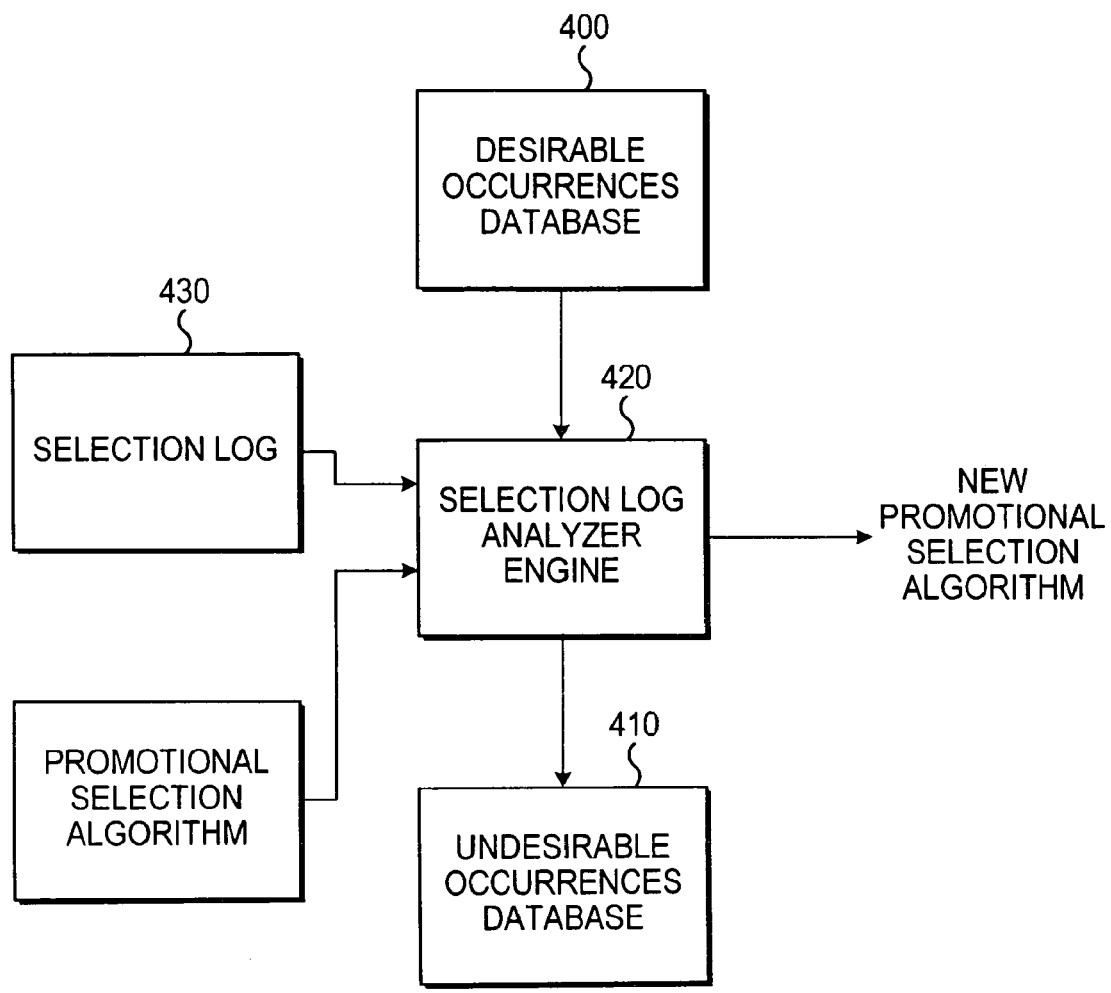
FIG. 5 is an illustrative dataflow diagram for analyzing a selection log to determine if indicators are being selected optimally in accordance with the present invention.

Main facility 12 of FIG. 1 may include log analyzer 31 as described above. Log analyzer 30 may make changes to a promotional selection algorithm if the algorithm does not provide for optimal selection of indicators of video-on-demand offerings. Updating promotional selection algorithms may be performed as described, for example, in above-mentioned Lumley et al. U.S. patent application Ser. No. 09/227,401, filed Jan. 9, 1999. FIG. 5 is an illustrative dataflow diagram for analyzing a selection log to determine if indicators are being selected optimally. Log analyzer 31 may, for example, be programmed with desirable occurrences database 400 and undesirable occurrences database 410. Desirable occurrences database 400 may include a number of rules that define desirable selections. Desirable occurrences database 400 may, for example, define as desirable having a large number of indicators for programs of a particular theme during a particular time slot, having certain indicators for programs in certain time slots for different time zones, having particular indicators sent to distribution facilities of a certain service configuration (e.g., providers of multiple video-on-demand channels as opposed to those with few), or any other suitable desirable occurrence.

Undesirable occurrences database 410 may include a number of rules that define undesirable selections. Undesirable occurrences database 410 may define as undesirable, for example, having the same indicator presented more than one time in a row or more than a number of times an hour, having indicators of a particular theme during a particular time slot (e.g., adult video-on-demand promotions at 3:00 p.m.), or any other undesirable occurrence.

Selection log analyzer engine 420 running on log analyzer 31 may compare the selection log 430 with desirable occurrences database 400 and undesirable occurrences database 410. Selection log analyzer engine 420 may be any suitable process or application capable of, for example, comparing selection log 430, desirable occurrences database 400, and undesirable occurrences database 410. Selection log analyzer engine 420 may make changes to the promotional selection algorithm to increase the likelihood of having desirable occurrences and to reduce the likelihood of having undesirable occurrences. The new promotional selection algorithm may be generated by selection log analyzer engine 420 and provided by data source 14 to interactive application equipment 17 for use by indicator selector 44 during indicator selection.

The selection log may also be used by main facility 12 to test planned changes for a promotional selection algorithm. Main facility 12 may have, for example, an indicator selector 44 and a log generator 43 to which indicators are supplied and selected according to a test promotional selection algorithm. The test promotional selection algorithm may, for example, be a modified version of the current algorithm used by indicator list generator 44 at the distribution facilities 16, or it may be a totally new algorithm. The test selection log may be analyzed by log analyzer 31, and the system may change the test promotional selection algorithm if indicators are not being presented optimally. This process may continue until the test promotional selection algorithm selects indicators as close to optimally as may be determined without running the promotional selection algorithm in the field.

The promotional selection algorithm already running on interactive application equipment 17 may be modified or may be replaced by the test promotional selection algorithm. Promotional selection algorithm testing may also be accomplished by running a test promotional selection algorithm on interactive application equipment 17 in addition to an already running promotional selection algorithm (e.g., as a separate process).

The interactive display generated by the program guide or other interactive application may include any suitable indicator of video-on-demand offerings and any other suitable content. Indicators of video-on-demand offerings may include, for example, promotions for video-on-demand offerings, program listings for video-on-demand offerings, or any other suitable indicator. The interactive display may include, for example, a browse display that provides a user with an opportunity to browse video-on-demand program listings while watching a television program. The interactive display may include, for example, a series of buttons or other selectable on-screen display elements that contain listings for video-on-demand program listings. In still another suitable approach, the interactive display may include a screening room that allows users to watch previews or clips of video-on-demand programs by selecting video-on-demand program listings. Indicators of video-on-demand offerings are included in the interactive display based on the promotional selection algorithm.

Figure 6:
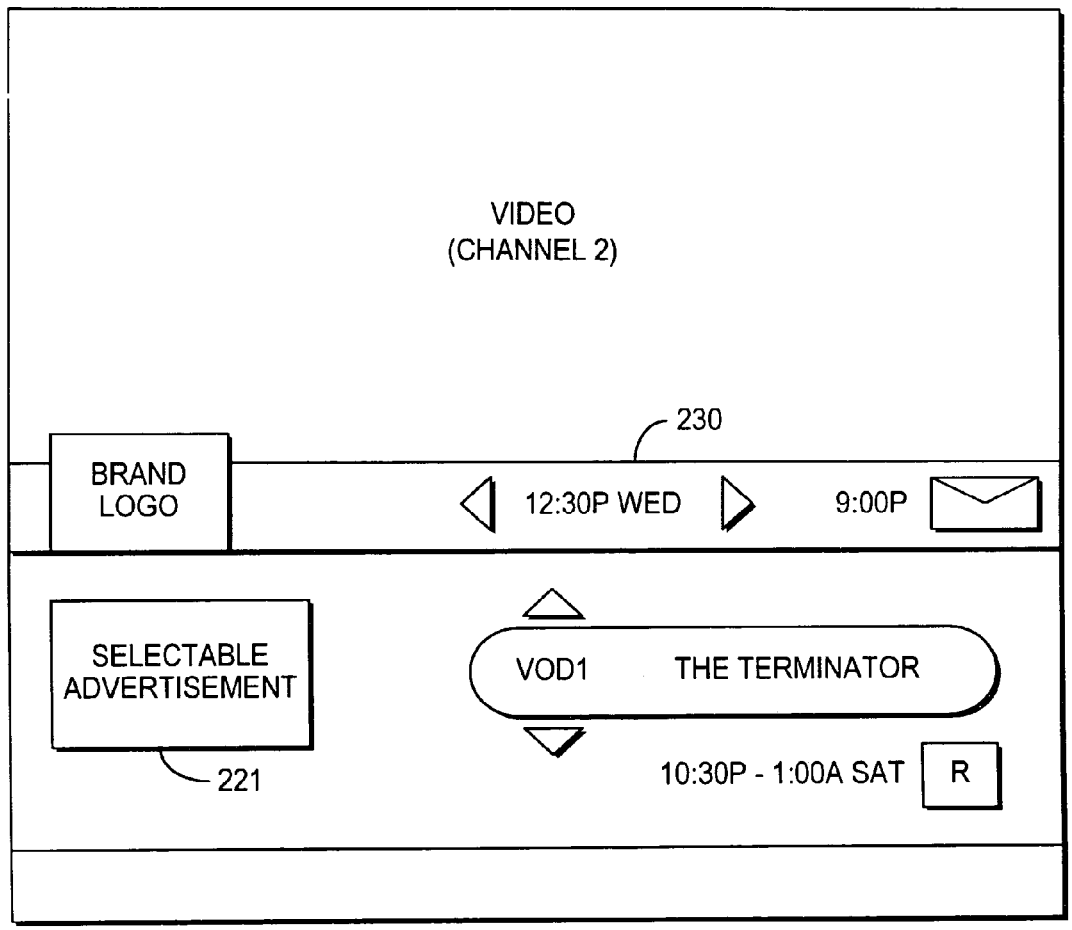
FIGS. 6-9 are illustrative interactive displays in accordance with the present invention.

FIG. 6 shows illustrative "BROWSE" overlay 230 that the program guide may display when a user opts to browse through program listings for a given time slot while watching a program. A user may browse through program listings by, for example, using remote control arrow keys. The BROWSE overlay allows a user to continue to watch a program on a particular channel (e.g., channel 2) while browsing for information on programs that are playing on other channels and at other times.

The program guide may provide a user with an opportunity to change time slots and channels in order to browse through additional program listings for video-on-demand programs according to the selection algorithm. Indicator list generator 44 may, for example, select program listings for video-on-demand programs before listings for regular channels. A user may indicate a desire to browse through additional program listings by, for example, pressing "up", "down", "left", and "right" arrows to access additional channels and time slots. After the user browses through listing for video-on-demand programs, the program guide may provide listings for non-video-on-demand programs.

Browse overlay 230 may also include selectable advertisements, such as selectable advertisements 221. Selectable advertisements 221 may, for example, include text, graphics, video, audio, animations, or other multimedia advertising the video-on-demand programs or other television programs, channels, or products. When a user selects a selectable advertisement 221, the program guide may display information (e.g., video-on-demand program information) or take other actions related to the content of the advertisement. Advertisements 221 may be included in browse overlay 230 according to the selection algorithm. If desired, different selection algorithms may be run for selecting indicators and for selecting promotions.

Figure 7:
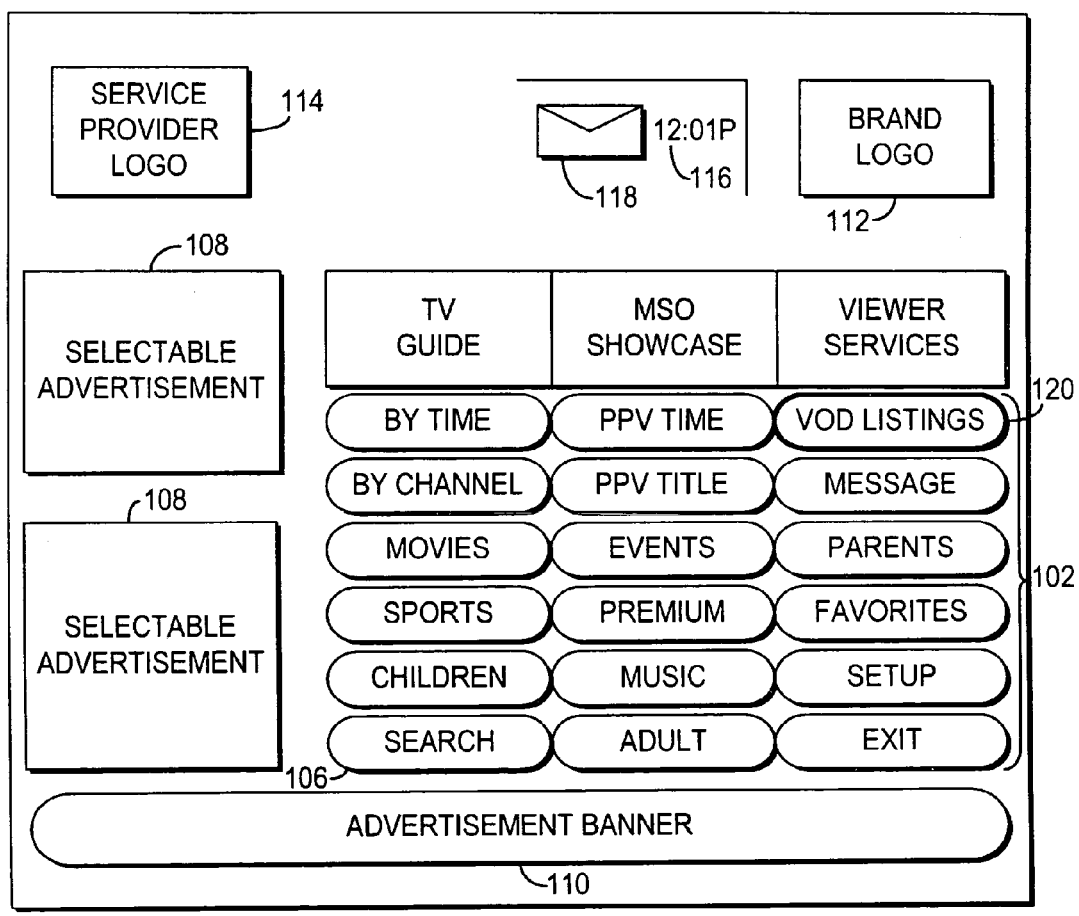

A main menu screen, such as illustrative main menu screen 100 of FIG. 7, may include menu 102 of selectable program guide features 106. If desired, program guide features 106 may be organized according to feature type. In menu 102, for example, program guide features 106 have been organized into three columns. The column labeled "TV GUIDE" is for listings related features, the column labeled "MSO SHOWCASE" is for multiple service organization (MSO) related features, and the column labeled "VIEWER SERVICES" is for viewer related features. The interactive television program guide may generate a display screen for a particular program guide feature when a user selects that feature from menu 102.

Main menu screen 100 may include one or more selectable advertisements 108. Selectable advertisements 108 may, for example, include text, graphics, video, audio, animations, or other multimedia advertising video-on-demand programs or other programs, channels, or products, based on the promotional selection algorithm. When a user selects a selectable advertisement 108, the program guide may display information (e.g., video-on-demand program information) or take other actions related to the content of the advertisement. Pure text advertisements may be presented, if desired, as illustrated by selectable advertisement banner 110. Advertisements 108 and 110 may be included in main menu screen 100 (or other screens) according to one or more promotional selection algorithms if desired.

Main menu screen 100 may also include other screen elements. The brand of the program guide product may be indicated, for example, using a product brand logo graphic such as product brand logo graphic 112. The identity of the television service provider may be presented, for example, using a service provider logo graphic such as service provider logo graphic 114. The logos may be included in the program guide data allowing for on-the-fly configurability of the display screens. The current time may be displayed in clock display region 116. In addition, a suitable indicator such as indicator graphic 118 may be used to indicate to a user that mail from a cable operator or program guide provider is waiting for a user if the program guide supports messaging functions.

The interactive television program guide may provide a user with an opportunity to view video-on-demand program listings. A user may indicate a desire to view video-on-demand program listings by, for example, positioning highlight region 120 over a desired program guide feature 106, such as "VOD Listings" feature 106. Alternatively, the program guide may present video-on-demand program listings when a user presses a suitable key (e.g., a "guide" key) on remote control 40. When a user indicates a desire to view video-on-demand program listings, the program guide generates an appropriate video-on-demand program listings screen for display on display device 45 (FIG. 4). A video-on-demand program listings screen may contain one or more groups or lists of video-on-demand program listings organized according to one or more organization criteria (e.g., by time, by program category, etc.).

The program guide may, for example, provide a user with an opportunity to view video-on-demand listings by time, according to a number of categories (e.g., movies, sports, children, etc.), or may allow a user to search for a listing by title. Video-on-demand program listings may be displayed using any suitable list, table, grid, or other suitable display arrangement. If desired, video-on-demand program listings screens may include selectable advertisements, product brand logo graphics, service provider brand graphics, clocks, or any other suitable indicator or graphic.

Figure 8:
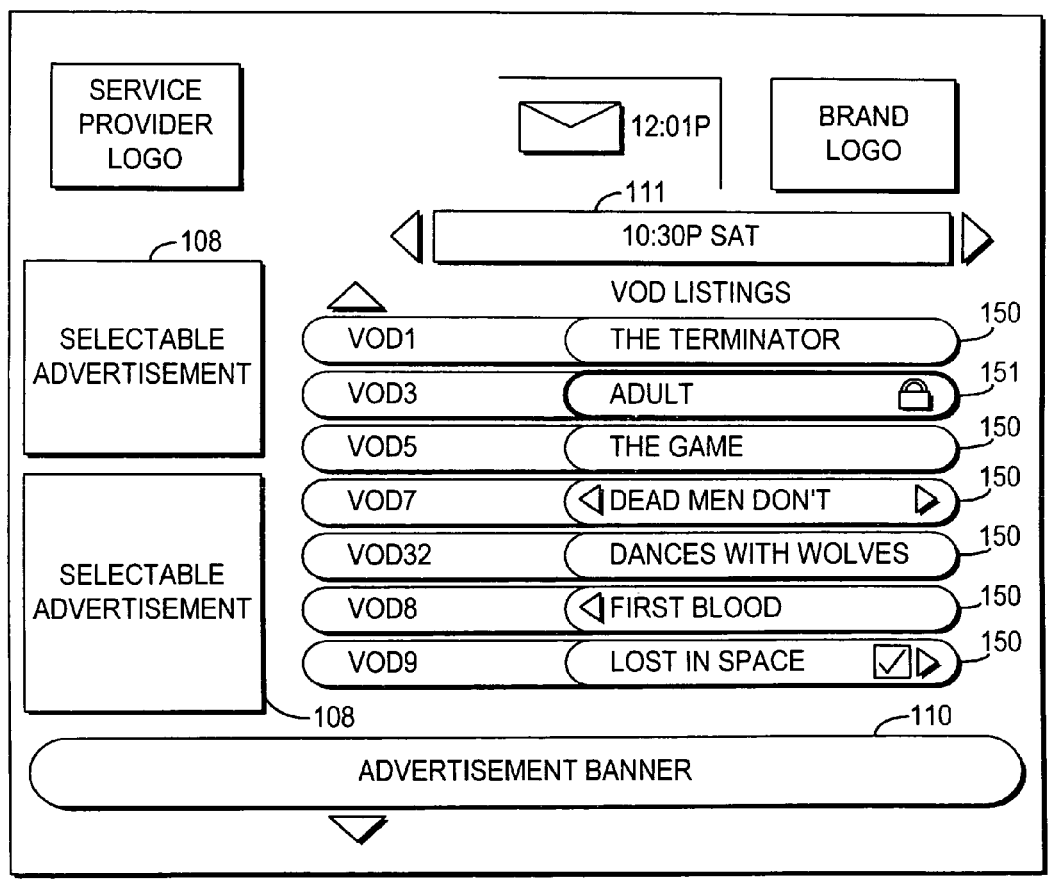

An illustrative video-on-demand by time program listings screen 130 is shown in FIG. 8. Program listings screen 130 of FIG. 8 may include highlight region 151, which highlights the current program listing 150. A user may position highlight region 151 by entering appropriate commands with user interface 46. For example, if user interface 46 has a keypad, a user can position highlight region 151 using "up" and "down" arrow keys on remote control 40. A user may select a listing by, for example, pressing on the "OK" or "info" key on remote control 40. Alternatively, a touch sensitive screen, trackball, voice recognition device, or other suitable device may be used to move highlight region 151 or to select program listings without the use of highlight region 151. In still another approach, a user may speak a television program listing into a voice request recognition system. These methods of selecting program listings are merely illustrative. Any other suitable approach for selecting program listings may be used if desired.

A user may view additional video-on-demand listings for the time slot indicated in timebar 111 by, for example, pressing an "up" or "down" arrow, or a "page up" or "page down" key on remote control 40. The user may also see listings for the next 24 hour period, or the last 24 hour period, by pressing a "day forward" or "day backward" key on remote control 40, respectively. If there are no listings starting exactly 24 hours in the indicated direction, the program guide may pick programs starting at either closer or further than 24 hours away. If desired, the program guide may require a user to scroll through advertisement banner 110. A user may view program listings for other time slots by, for example, pressing "right" and "left" arrows on remote control 40, or by scrolling up or down until listings for the next time slot are displayed. Timebar 111 may change its display to the previous or next time slot accordingly.

As shown in FIG. 7, the displayed indicators, in this example listings 150, are not displayed in channel or source order because the listings are displayed according to a promotional selection algorithm which may cause indicator selector 44 to select listings from video-on-demand channels or sources in a way that presents the most desirable indicators (e.g., the indicators that satisfy primary playability levels of a promotional philosophy) before other indicators. If desired, the sources for the indicators may be generated in real time, and listings 150 labeled accordingly, so that the user is not aware that the listings are presented out of order.

Figure 9:
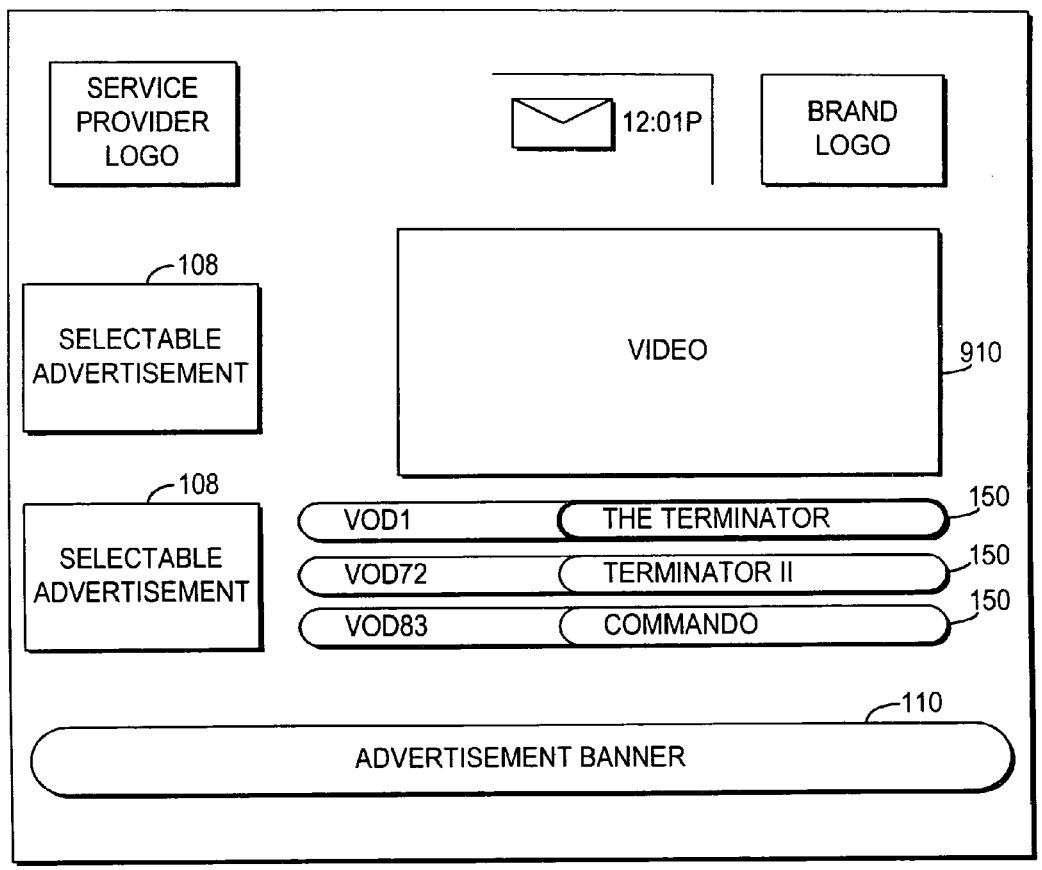

FIG. 9 shows another illustrative interactive display in which indicators of video-on-demand programming are displayed according to a promotional selection algorithm. Screening room 900 of FIG. 9 may provide users with an opportunity to preview one or more video-on-demand programs by, for example, selecting a listing 150. The listings 150 are selected for presentation by indicator selector 44 according to the promotional selection algorithm. In this example, the promotional philosophy may require that only movies starring Arnold Schwarzeneggar are available for previewing. Video window 910 may display a clip of a movie or a trailer associated with a movie when the user selects a listing 150. In another suitable approach, the display of video window 910 may be synchronized with the currently highlighted listings 150; that is, as the user navigates within listings 150, video window 810 may display a clip or preview associated with the currently highlighted listing.

Figure 10:
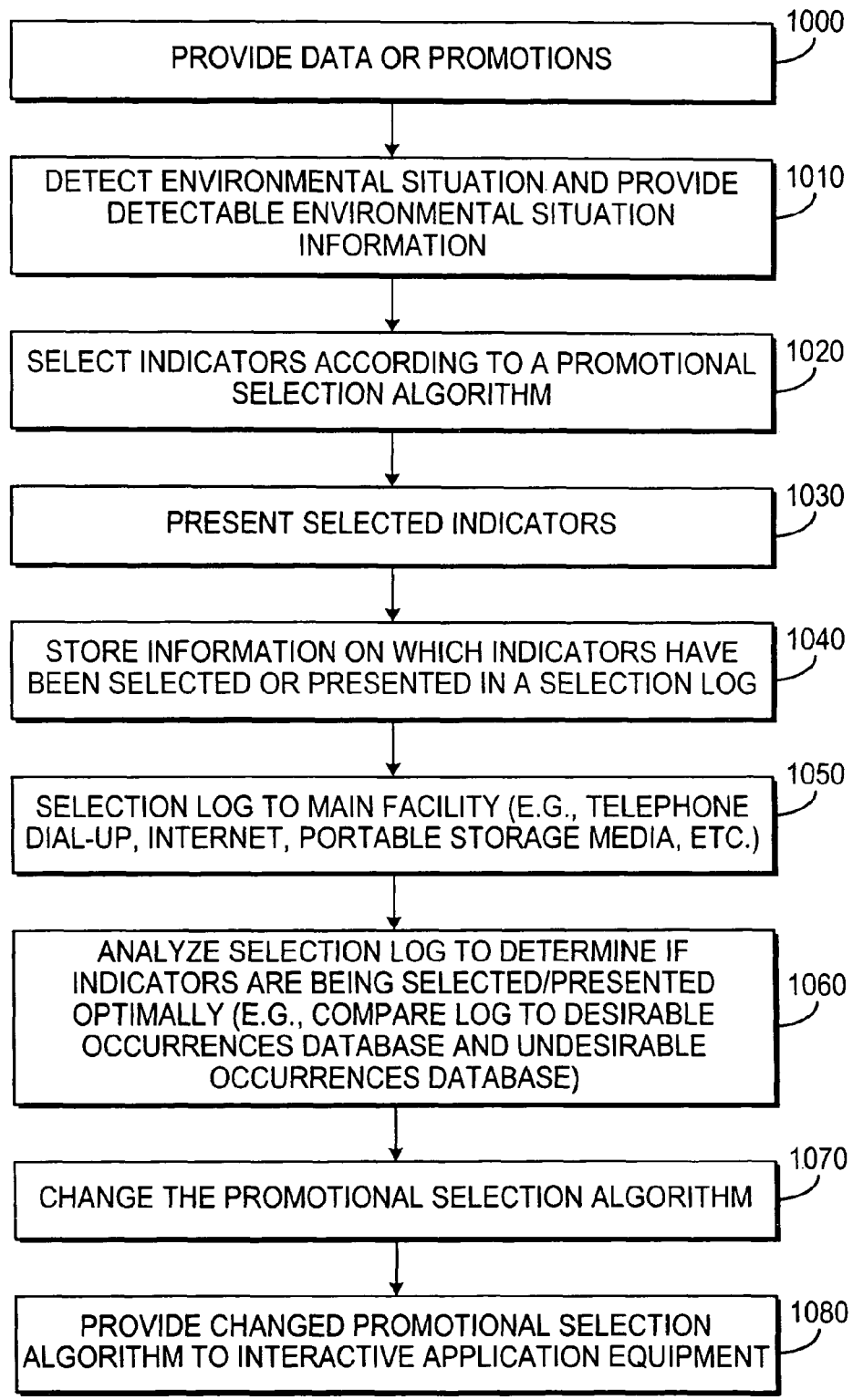
FIGS. 10 and 11 are flow charts of illustrative steps involved in providing indicators of video-on-demand programming in accordance with the present invention.
Figure 11:
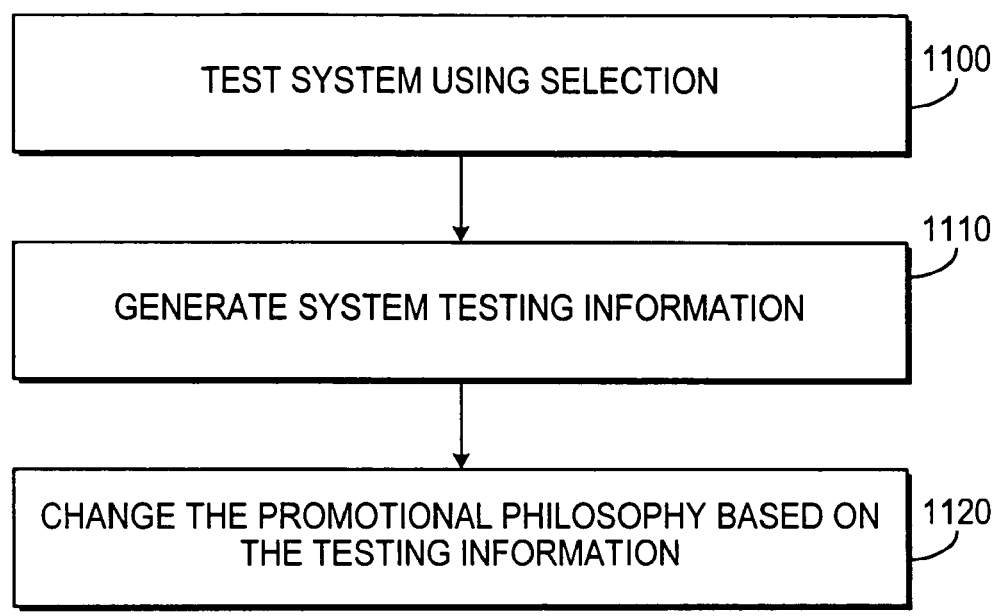

FIGS. 10-11 are flowcharts of illustrative steps involved in providing indicators of video-on-demand programs according to a promotional selection algorithm in accordance with the principles of the present invention. The steps shown in FIGS. 10-12 are illustrative and may generally be performed in any suitable order. FIG. 10 is a flowchart of illustrative steps involved in operating the system of FIG. 1. Main facility 12 provides data on promotions for indicators to interactive application equipment 17 at step 1000. At step 1010, environmental situations, e.g., the weather, are detected and detectable environmental situation information is provided to indicator selector 44.

At step 1020, indicators are selected for display 1020 by indicator selector 44. Indicators are selected for display according to the promotional selection algorithm, such as a promotional philosophy. The selected indicators are presented in the interactive display at step 1030. The interactive display may be any suitable display such as, for example, a browse display, listings screen, screening room, or any other suitable interactive display.

Information on which indicators are selected or presented is stored by log generator 43 in a selection log at step 1040. At step 1050, the selection log may be provided to main facility 12 for analysis. The selection log may be provided to main facility 12 using any suitable transmission method (e.g., telephone dial-up, very small aperture transmission (VSAT), portable storage media, etc.). The selection log may be analyzed by log analyzer 31 to determine if indicators are being optimally selected or presented (step 1060). For example, the selection log may be compared with a desirable occurrences and an undesirable occurrences database. If desired, the promotional selection algorithm can be changed to increase the likelihood of desirable occurrences and to decrease the likelihood of undesirable occurrences (step 1070). At step 1080, the changed promotional selection algorithm may be provided to interactive application equipment 17.

FIG. 11 is a flowchart of illustrative steps involved in testing a promotional selection algorithm in accordance with the present invention. Testing of a promotional selection algorithm may be desirable when changes to the promotional selection algorithm are proposed and it is desirable to see how the new promotional selection algorithm will affect the selection of indicators for the interactive display. At step 1100, a promotional selection algorithm is tested using the selection log to determine if the system will select indicators optimally. This may be accomplished, for example, by comparing the selection log with a desirable occurrence database and an undesirable occurrences database. The testing may be performed at the main facility or other interested testing facility, or by monitoring a separate process running on interactive application equipment 17. System testing information (e.g., the types or number of desirable and undesirable occurrences that occur) may be generated at step 1110. If the promotional selection algorithm as tested is desirable, changes to the existing promotional selection algorithm are made accordingly at step 144. The existing promotional selection algorithm may be replaced by the test promotional selection algorithm.

Thus, an interactive display having indicators of video-on-demand programs selected according to a promotional selection algorithm is provided. The principles of the present invention may be applied to any suitable system in which any type of information or programming, whether data, audio, video, test or graphic, and whether analog or digital, is provided on demand. For example, the principles of the present invention may be used in an audio-on-demand system. One skilled in the art will appreciate that the present invention can be practiced by other than the described embodiments, which are presented for purposes of illustration and not of limitation, and the present invention is limited only by the claims which follow.

What is claimed is:

1. A method for providing video-on-demand program listings in an interactive display according to a promotional selection algorithm, the method comprising:
receiving video-on-demand program listings and first data that is based on a first promotional philosophy, wherein the first data identifies a subset of less than all of the received video-on-demand listings and includes a condition for selecting the identified subset of video-on-demand listings;
detecting situational data;
determining, using the detected situational data, whether the condition for selecting the subset of video-on-demand listings is satisfied;
based on the determination that the condition for selecting the subset of video-on-demand listings is satisfied, selecting the subset of video-on-demand listings for inclusion in the interactive display;
generating the interactive display that presents the subset of video-on-demand listings;
receiving second data that is based on a second promotional philosophy; and
updating the condition for selecting the subset of video-on-demand listings according to the second promotional philosophy using the second data.

2. The method defined in claim 1 wherein the interactive display is a browse display that provides a user with an opportunity to browse through the video-on-demand program listings.

3. The method defined in claim 1 wherein the interactive display is a video-on-demand program listings display that provides a user with an opportunity to navigate within the video-on-demand program listings.

4. The method defined in claim 1 wherein the interactive display is a screening room that provides a user with an opportunity to preview a video-on-demand program associated with the subset of video-on-demand listings.

5. The method defined in claim 1 further comprising generating for display the video-on-demand program listings.

6. The method defined in claim 1 wherein the detected situational data comprises a user preference profile.

7. The method defined in claim 1 further comprising:
generating a selection log that includes a list of the selected video-on-demand program listings;
generating a first database that includes data defining desirable selections of video-on-demand listings;
generating a second database that includes data defining undesirable selections of video-on-demand listings; and
updating the first promotional philosophy based on the selection log, the first database and the second database.

8. A system in which video-on-demand program listings are provided in an interactive display according to a promotional selection algorithm, the system comprising:
a communications device configured to receive video-on-demand program listings, first data based on a first promotional philosophy wherein the first data identifies a subset of less than all of the received video-on-demand listings and includes a condition for selecting the identified subset of video-on-demand listings, and second data based on a second promotional philosophy;
an indicator selector configured to:
detect situational data,
determine, using the detected situational data, whether the condition for selecting the subset of video-on-demand listings is satisfied,
select, based on the determination that the condition for selecting the subset of video-on-demand listings is satisfied, the subset of video-on-demand listings for inclusion in the interactive display, and
update the condition for selecting the subset of video-on-demand listings according to the second promotional philosophy using the second data; and
an interactive application configured to generate an interactive display that presents the subset of video-on-demand listings.

9. The system defined in claim 8 wherein the interactive display is a browse display that provides a user with an opportunity to browse through the video-on-demand program listings.

10. The system defined in claim 8 wherein the interactive display is a video-on-demand program listings display that provides a user with an opportunity to navigate within the video-on-demand program listings.

11. The system defined in claim 8 wherein the interactive display is a screening room that provides a user with an opportunity to preview a video-on-demand program associated with the subset of video-on-demand listings.

12. The system defined in claim 8 further comprising a data source configured to generate for display the video-on-demand program listings.

13. The system defined in claim 8 wherein the detected situational data comprises a user preference profile.

14. The system defined in claim 8 further comprising:
a log generator configured to generate a selection log that includes a list of the selected video-on-demand program listings; and
a log analyzer configured to:
generate a first database that includes data defining desirable selections of video-on-demand listings;
generate a second database that includes data defining undesirable selections of video-on-demand listings; and
receive the selection log and update the first promotional philosophy based on the selection log, the first database and the second database.

15. The method defined in claim 1 further comprising selecting one or more advertisements for inclusion in the interactive display, wherein the one or more selected advertisements promote programs other than those associated with the subset of video-on-demand listings.

16. The system defined in claim 8, wherein the indicator selector selects one or more advertisements for inclusion in the interactive display, and wherein the one or more selected advertisements promote programs other than those associated with the subset of video-on-demand listings.

17. The method defined in claim 1, wherein the first promotional philosophy is configured to target a first audience and the second promotional philosophy is configured to target a second audience.

18. The system defined in claim 8, wherein the first promotional philosophy is configured to target a first audience and the second promotional philosophy is configured to target a second audience.

19. The method defined in claim 1, wherein the second data is received periodically or on-demand.

20. The system defined in claim 8, wherein the second data is received periodically or on-demand.

21. The method of claim 1, wherein the situational data comprises one of the group of: time of day, upcoming holiday or event, day of the week, current weather, a user's channel lineup, a user's channel subscription, or user demographics.

22. The system of claim 8, wherein the situational data comprises one of the group of: time of day, upcoming holiday or event, day of the week, current weather, a user's channel lineup, a user's channel subscription, or user demographics.

\* \* \* \* \*